(12) United States Patent
Shah et al.

(10) Patent No.: US 8,585,934 B2
(45) Date of Patent: Nov. 19, 2013

(54) COMPOSITES COMPRISING CARBON NANOTUBES ON FIBER

(75) Inventors: Tushar K. Shah, Columbia, MD (US); Bradley W. Pietras, Shamong, NJ (US); Daniel Jacob Adcock, Columbia, MD (US); Harry C. Malecki, Abingdon, MD (US); Mark R. Alberding, Glen Arm, MD (US)

(73) Assignee: Applied NanoStructured Solutions, LLC, Baltimore, MD (US)

( * ) Notice: Subject to any disclaimer, the term of this patent is extended or adjusted under 35 U.S.C. 154(b) by 218 days.

(21) Appl. No.: 12/707,617

(22) Filed: Feb. 17, 2010

(65) Prior Publication Data

US 2011/0024694 A1    Feb. 3, 2011

Related U.S. Application Data

(60) Provisional application No. 61/263,807, filed on Nov. 23, 2009, provisional application No. 61/153,143, filed on Feb. 17, 2009.

(51) Int. Cl.
*H01B 1/18* (2006.01)
*H01B 1/24* (2006.01)

(52) U.S. Cl.
USPC ........... 252/502; 252/511; 252/510; 977/742; 977/753

(58) Field of Classification Search
USPC ................... 252/511, 502, 510; 977/742, 753
See application file for complete search history.

(56) References Cited

U.S. PATENT DOCUMENTS

| | | |
|---|---|---|
| 2,412,707 A | 12/1946 | Barnett |
| 3,304,855 A | 2/1967 | Oebell |
| 3,584,758 A | 6/1971 | Moore |
| 4,104,083 A | 8/1978 | Hirano |
| 4,515,107 A | 5/1985 | Fournier et al. |
| 4,530,750 A | 7/1985 | Alsenberg et al. |
| 4,566,969 A | 1/1986 | Klein |
| 4,707,349 A | 11/1987 | Hjersted |
| 4,728,399 A | 3/1988 | Moehwald |
| 4,837,073 A | 6/1989 | McAllister et al. |
| 4,894,293 A | 1/1990 | Breit et al. |
| 4,920,917 A | 5/1990 | Nakatani et al. |
| 4,976,899 A | 12/1990 | Rousseau et al. |
| 5,093,155 A | 3/1992 | Miyazaki et al. |
| 5,130,194 A | 7/1992 | Baker et al. |
| 5,156,225 A | 10/1992 | Murrin |
| 5,173,367 A | 12/1992 | Liimatta et al. |
| 5,221,605 A | 6/1993 | Bard et al. |
| 5,223,353 A | 6/1993 | Ohsawa et al. |
| 5,225,265 A | 7/1993 | Prandy et al. |
| 5,227,238 A | 7/1993 | Hirai et al. |
| 5,238,808 A | 8/1993 | Bard et al. |
| 5,246,794 A | 9/1993 | Blomgren et al. |
| 5,310,687 A | 5/1994 | Bard et al. |
| 5,370,921 A | 12/1994 | Cedarleaf |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,639,984 A | 6/1997 | Nielson |
| 5,714,089 A | 2/1998 | Bard et al. |
| 5,731,147 A | 3/1998 | Bard et al. |
| 5,744,075 A | 4/1998 | Klett et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,783 A | 11/2000 | Brohm et al. |
| 6,184,280 B1 | 2/2001 | Shibuta |
| 6,221,154 B1 | 4/2001 | Lee et al. |
| 6,232,706 B1 | 5/2001 | Dai et al. |
| 6,251,520 B1 | 6/2001 | Blizzard et al. |
| 6,265,466 B1 | 7/2001 | Glatkowski et al. |
| 6,331,209 B1 | 12/2001 | Jang et al. |
| 6,333,016 B1 | 12/2001 | Resasco et al. |
| 6,361,861 B2 | 3/2002 | Gao |
| 6,382,120 B1 | 5/2002 | Keire |
| 6,413,487 B1 | 7/2002 | Resasco et al. |
| 6,420,293 B1 | 7/2002 | Chang et al. |
| 6,455,021 B1 | 9/2002 | Saito |
| 6,465,057 B1 | 10/2002 | Nakahigashi et al. |
| 6,479,028 B1 | 11/2002 | Kaner et al. |

(Continued)

FOREIGN PATENT DOCUMENTS

| | | |
|---|---|---|
| CN | 101698975 | 4/2008 |
| CN | 101173386 A | 5/2008 |

(Continued)

OTHER PUBLICATIONS

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

(Continued)

*Primary Examiner* — Douglas McGinty
(74) *Attorney, Agent, or Firm* — McDermott Will & Emery LLP

(57) ABSTRACT

A composite composition includes a plurality of carbon nanotube (CNT)-infused fibers dispersed in a matrix material. The amount of carbon nanotubes in the composition is in a range between about 0.1% percent by weight to about 60 percent by weight of the composite.

32 Claims, 15 Drawing Sheets

(56) References Cited

U.S. PATENT DOCUMENTS

| | | |
|---|---|---|
| 6,479,030 B1 | 11/2002 | Firsich |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,653,619 B2 | 11/2003 | Chin et al. |
| 6,673,392 B2 | 1/2004 | Lee et al. |
| 6,692,717 B1 | 2/2004 | Smalley et al. |
| 6,699,525 B2 | 3/2004 | Jayatissa |
| 6,762,237 B2 | 7/2004 | Glatkowski et al. |
| 6,765,949 B2 | 7/2004 | Chang |
| 6,790,425 B1 | 9/2004 | Smalley et al. |
| 6,818,821 B2 | 11/2004 | Fujieda et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,921,575 B2 | 7/2005 | Horiuchi et al. |
| 6,934,600 B2 | 8/2005 | Jang et al. |
| 6,936,653 B2 | 8/2005 | McElrath et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,074,294 B2 | 7/2006 | Dubrow |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,502 B2 | 10/2006 | Smalley et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Ken et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,211,320 B1 | 5/2007 | Cooper et al. |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,285,591 B2 | 10/2007 | Winey et al. |
| 7,294,302 B2 | 11/2007 | Kolde et al. |
| 7,329,698 B2 | 2/2008 | Noguchi et al. |
| 7,338,684 B1 | 3/2008 | Curliss et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,411,019 B1 | 8/2008 | Bley |
| 7,419,601 B2 | 9/2008 | Cooper et al. |
| 7,431,965 B2 | 10/2008 | Grigorian et al. |
| 7,442,284 B2 | 10/2008 | Ren et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,544,415 B2 | 6/2009 | Chen et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,729,100 B2 | 6/2010 | Llorente Gonzalez et al. |
| 7,771,289 B2 | 8/2010 | Palumbo et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,867,468 B1 | 1/2011 | Haddon et al. |
| 7,867,616 B2 | 1/2011 | Harutyunyan |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,048,490 B2 | 11/2011 | Watanabe et al. |
| 2002/0035170 A1 | 3/2002 | Glatkowski et al. |
| 2002/0085968 A1 | 7/2002 | Smalley et al. |
| 2002/0090331 A1 | 7/2002 | Smalley et al. |
| 2003/0024884 A1 | 2/2003 | Petrik |
| 2003/0042147 A1 | 3/2003 | Talin et al. |
| 2003/0044678 A1 | 3/2003 | Winarski |
| 2003/0094734 A1 | 5/2003 | Deckard et al. |
| 2003/0102585 A1 | 6/2003 | Poulin et al. |
| 2003/0111333 A1 | 6/2003 | Montgomery et al. |
| 2003/0166744 A1 | 9/2003 | Van Dijk et al. |
| 2004/0007955 A1 | 1/2004 | Yaniv et al. |
| 2004/0026234 A1 | 2/2004 | Vanden Brande et al. |
| 2004/0082247 A1 | 4/2004 | Desai et al. |
| 2004/0105807 A1 | 6/2004 | Fan et al. |
| 2004/0171725 A1 | 9/2004 | Richardson et al. |
| 2004/0184981 A1 | 9/2004 | Liu et al. |
| 2004/0245088 A1 | 12/2004 | Gardner |
| 2004/0253167 A1 | 12/2004 | Silva et al. |
| 2005/0005554 A1 | 1/2005 | Oppermanm |
| 2005/0023727 A1 | 2/2005 | Sampson |
| 2005/0042163 A1 | 2/2005 | Allison et al. |
| 2005/0049355 A1 | 3/2005 | Tang et al. |
| 2005/0062024 A1 | 3/2005 | Bessette et al. |
| 2005/0081752 A1 | 4/2005 | Snyder et al. |
| 2005/0090024 A1 | 4/2005 | Chopra |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0119371 A1 | 6/2005 | Drzal et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0204984 A1 | 9/2005 | Finot |
| 2005/0230560 A1 | 10/2005 | Glatkowski et al. |
| 2005/0260120 A1 | 11/2005 | Smalley et al. |
| 2005/0260412 A1 | 11/2005 | Gardner |
| 2005/0263456 A1 | 12/2005 | Cooper et al. |
| 2005/0287064 A1 | 12/2005 | Mayne et al. |
| 2006/0002841 A1 | 1/2006 | Chen et al. |

(56) References Cited

U.S. PATENT DOCUMENTS

| | | |
|---|---|---|
| 2006/0047052 A1 | 3/2006 | Barrera et al. |
| 2006/0052509 A1 | 3/2006 | Saitoh |
| 2006/0057361 A1 | 3/2006 | Ounaies et al. |
| 2006/0060825 A1 | 3/2006 | Glatkowski |
| 2006/0065546 A1 | 3/2006 | Curodeau |
| 2006/0078705 A1 | 4/2006 | Glatkowski et al. |
| 2006/0099135 A1 | 5/2006 | Yodh et al. |
| 2006/0110599 A1 | 5/2006 | Honma et al. |
| 2006/0118158 A1 | 6/2006 | Zhang et al. |
| 2006/0121275 A1 | 6/2006 | Poulin et al. |
| 2006/0135677 A1 | 6/2006 | Huang et al. |
| 2006/0159916 A1 | 7/2006 | Dubrow et al. |
| 2006/0166003 A1 | 7/2006 | Khabashesku et al. |
| 2006/0177602 A1 | 8/2006 | Dijon et al. |
| 2006/0198956 A1 | 9/2006 | Eres |
| 2006/0202168 A1 | 9/2006 | Barrera et al. |
| 2007/0003817 A1 | 1/2007 | Umeda et al. |
| 2007/0020167 A1 | 1/2007 | Han et al. |
| 2007/0048521 A1 | 3/2007 | Istvan |
| 2007/0054105 A1 | 3/2007 | Hsiao |
| 2007/0087198 A1 | 4/2007 | Dry |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0135588 A1 | 6/2007 | Diakoumakos et al. |
| 2007/0189953 A1 | 8/2007 | Bai et al. |
| 2007/0259128 A1 | 11/2007 | Parsapour |
| 2007/0265379 A1 | 11/2007 | Chen et al. |
| 2008/0014431 A1 | 1/2008 | Lashmore et al. |
| 2008/0020193 A1 | 1/2008 | Jang et al. |
| 2008/0025906 A1 | 1/2008 | Lin et al. |
| 2008/0039557 A1* | 2/2008 | Li et al. .................. 523/468 |
| 2008/0048364 A1 | 2/2008 | Armenlades et al. |
| 2008/0053922 A1 | 3/2008 | Honsinger, Jr. et al. |
| 2008/0075954 A1 | 3/2008 | Wardle et al. |
| 2008/0118753 A1 | 5/2008 | Poulin et al. |
| 2008/0137890 A1 | 6/2008 | Petersen et al. |
| 2008/0145528 A1 | 6/2008 | Deng et al. |
| 2008/0155888 A1 | 7/2008 | Vick et al. |
| 2008/0160286 A1 | 7/2008 | Asrar et al. |
| 2008/0170982 A1 | 7/2008 | Zhang et al. |
| 2008/0173111 A1 | 7/2008 | Thostenson et al. |
| 2008/0176987 A1 | 7/2008 | Trever et al. |
| 2008/0182108 A1 | 7/2008 | Curliss et al. |
| 2008/0187648 A1 | 8/2008 | Hart et al. |
| 2008/0237922 A1 | 10/2008 | Vaidyanathan et al. |
| 2008/0247938 A1 | 10/2008 | Tsai et al. |
| 2008/0248275 A1 | 10/2008 | Jang et al. |
| 2008/0279753 A1 | 11/2008 | Harutyunyan |
| 2008/0286546 A1 | 11/2008 | Lashmore et al. |
| 2008/0286564 A1 | 11/2008 | Tsotsis |
| 2008/0311301 A1 | 12/2008 | Diss et al. |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1* | 3/2009 | Alberding et al. ............ 427/577 |
| 2009/0081441 A1* | 3/2009 | Shah et al. .................. 428/222 |
| 2009/0088582 A1 | 4/2009 | Inagaki et al. |
| 2009/0092832 A1 | 4/2009 | Moireau |
| 2009/0099016 A1 | 4/2009 | Carruthers et al. |
| 2009/0099276 A1 | 4/2009 | Barrera et al. |
| 2009/0117363 A1 | 5/2009 | Wardle et al. |
| 2009/0121219 A1 | 5/2009 | Song et al. |
| 2009/0121727 A1 | 5/2009 | Lynch et al. |
| 2009/0126783 A1 | 5/2009 | Lin et al. |
| 2009/0136707 A1* | 5/2009 | Ueno ........................... 428/113 |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | DuFaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0277897 A1 | 11/2009 | Lashmore et al. |
| 2009/0282802 A1 | 11/2009 | Cooper et al. |
| 2009/0286079 A1 | 11/2009 | Barker et al. |
| 2009/0294753 A1 | 12/2009 | Hauge et al. |
| 2009/0311166 A1 | 12/2009 | Hart et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0143701 A1 | 6/2010 | Zhu et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0272891 A1 | 10/2010 | Malecki et al. |
| 2010/0276072 A1* | 11/2010 | Shah et al. .................. 156/184 |
| 2010/0279569 A1 | 11/2010 | Shah et al. |
| 2010/0311866 A1 | 12/2010 | Huang et al. |
| 2011/0017867 A1 | 1/2011 | Simmons et al. |
| 2011/0024409 A1 | 2/2011 | Shah et al. |
| 2011/0024694 A1 | 2/2011 | Shah et al. |
| 2011/0040007 A1 | 2/2011 | Chandrasekhar et al. |
| 2011/0068514 A1 | 3/2011 | Ruiz et al. |
| 2011/0089958 A1* | 4/2011 | Malecki et al. ............... 324/693 |
| 2011/0123735 A1* | 5/2011 | Shah et al. .................. 428/34.1 |
| 2011/0124483 A1 | 5/2011 | Shah et al. |
| 2011/0174519 A1* | 7/2011 | Shah et al. ................ 174/119 C |
| 2011/0186775 A1* | 8/2011 | Shah et al. ................ 252/182.32 |
| 2011/0297892 A1* | 12/2011 | Shah et al. .................. 252/511 |
| 2012/0000691 A1* | 1/2012 | Shah et al. ................ 174/102 R |

FOREIGN PATENT DOCUMENTS

| | | |
|---|---|---|
| IN | 01900DE2008 A | 3/2010 |
| KR | 100829001 | 5/2008 |
| TW | 200833861 | 8/2008 |
| WO | WO 03/082733 | 10/2003 |
| WO | WO 2005/075341 | 8/2005 |
| WO | WO 2006/048531 | 5/2006 |
| WO | WO/2006/048531 A1 | 5/2006 |
| WO | WO/2006/115486 A1 | 11/2006 |
| WO | WO 2007/015710 | 2/2007 |
| WO | WO/2007/061854 A2 | 5/2007 |
| WO | WO 2007063764 A1 * | 6/2007 |
| WO | WO/2007/089118 A1 | 8/2007 |
| WO | WO-2007/130979 A2 | 11/2007 |
| WO | WO/2007/149109 A2 | 12/2007 |
| WO | WO/2008/041183 A2 | 4/2008 |
| WO | WO/2008/054541 A2 | 5/2008 |
| WO | WO/2008/085634 A1 | 7/2008 |
| WO | WO 2008085634 A1 * | 7/2008 |
| WO | WO/2008/115640 A2 | 9/2008 |
| WO | WO 2009/004346 | 1/2009 |
| WO | WO 2009/103925 | 8/2009 |
| WO | WO 2009/110885 | 9/2009 |
| WO | WO 2009/124862 | 10/2009 |
| WO | WO-2011/053457 | 5/2011 |

OTHER PUBLICATIONS

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

(56) References Cited

OTHER PUBLICATIONS

Ci, et al., "Direct Growth of Carbon Nanotubes on the Surface of Ceramic Fibers", Carbon, 2005, pp. 883-886, vol. 43, No. 4, Elsevier Ltd.

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang, et al., "Penetration depth of atmospheric pressure plasma surface modification into multiple layers of polyester fabrics", Surface and Coatings Technology, 2007, pp. 77-83, vol. 202, Elsevier B.V.

Wang, et al., "Processing and property investigation of single-walled carbon nanotube (SWNT) buckypaper/epoxy resin matrix nanocomposites", Composites, Part A, 2004, pp. 1225-1232, vol. 35, Elsevier Ltd.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Eliseiver Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al., "Carbon Nanotubes with a Triangular Cross-section, Fabricated Using Anodic Porous Alumina as the Temple", Adv. Mater., 204, pp. 429-432, vol. 16, No. 5, Wiley-VCH Verlag GmbH & Co. KGaA, Weinheim, (2004).

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Vaccarini et al., "Reinforcement of an Epoxy Resin by Single Walled Nanotubes", AIP Conference Proceedings, Nov. 21, 2000, vol. 544, 521-525.

U.S. Appl. No. 12/766,817, filed Apr. 23, 2010, Tushar K. Shah.

U.S. Appl. No. 61/295,621, filed Jan. 15, 2010, Harry C. Malecki.

U.S. Appl. No. 61/297,704, filed Jan. 22, 2010, Tushar K. Shah.

Kramer, et al., Constrained Iron Catalysts for Single-Walled Carbon Nanotube Growth?, Langmuir 2005, 21, 8466-8470 [http://pubs.acs.org/dol/abs/10.1021/la0506729].

Lux, "PCT Application No. PCT/US2007/086875 Search Report and Written Opinion", May 13, 2008.

Wang et al., "Processing and Property Investigation of Single-Walled Carbon Nanotube ISWNT) Buckypapaper/Epoxy Resin Matrix Nanocomposit", Composites Part A: Applied Science and Manufacturing, Oct. 1, 2004, pp. 1225-1232. Publisher: PCT/ Published in : PCT.

Zhang et al., "Integration and characterization of aligned carbon nanotubes on metal/silicon substrates and effects of water", Applied Surface Science 255 (2009) 5003-5008, entire document.

Vaccarini, et al., "Reinforcement of an epoxy resin by single walled nanotubes," AIP Conference Proceedings 2000, <http://dx.doi.org/10/1063/1.1342567>.

* cited by examiner

US 8,585,934 B2

COMPOSITES COMPRISING CARBON NANOTUBES ON FIBER

This application claims priority from U.S. Provisional Patent Application No. 61/263,807, filed on Nov. 23, 2009 and U.S. Provisional Patent Application No. 61/153,143, filed on Feb. 17, 2009, which are incorporated herein by reference.

STATEMENT REGARDING FEDERALLY SPONSORED RESEARCH OR DEVELOPMENT

Not applicable.

BACKGROUND AND FIELD OF THE INVENTION

The present invention generally relates to carbon nanotubes (CNTs), and more specifically to CNTs incorporated in composite materials.

Carbon nanotubes (CNTs") exhibit roughly eighty times the strength, six times the toughness, as indicated by Young's Modulus, and one-sixth the density of high carbon steel. Due to these favorable mechanical properties, CNTs have been used as a reinforcing element in composite materials. CNT-based composites can be less dense than many metals, while providing improved strength and corrosion protection. CNTs also exhibit favorable properties for thermal and electrical applications as well.

Most processes for producing CNT-based composites involve direct mixing of loose CNTs or bundled CNT-based yarns into the matrix material of the nascent composite. When employing CNTs in this manner in a typical resin-type matrix material, the resultant composites are typically limited to a maximum of about three weight percent of carbon nanotubes in the finished composite material. The reason for this limitation is the resulting increased viscosity of the matrix and a decreased ability to impregnate the resulting composite.

CNTs have also been employed in hybrid composites in which two, three, or more different reinforcing elements are incorporated within a composite. Hybrid composite systems which incorporate nanoscale reinforcements require additional processing steps to properly disperse the nanoparticles, including CNTs. CNT incorporation into a matrix has the added challenge of controlling CNT orientation which adds to the processing complexity. Moreover, limitations on CNT loading due to various factors, such as large viscosity increases have been observed in hybrid composite systems as well.

Hybrid composite manufacturing processes become increasingly complex if variable CNT loading or different CNT types are needed in different portions of a composite structure. It would be beneficial to decrease the complexity of manufacture of CNT composites and tailored hybrid composites and to provide composite articles with improved CNT loading capacity while also controlling CNT orientation. The present invention satisfies these needs and provides related advantages as well.

SUMMARY OF THE INVENTION

In some aspects, embodiments disclosed herein relate to a composite composition that includes a plurality of carbon nanotube (CNT)-infused fibers dispersed in a matrix material. The amount of carbon nanotubes in the composition is in a range between about 0.1% percent by weight to about 60 percent by weight of the composite.

DETAILED DESCRIPTION OF THE INVENTION

The present invention is directed, in part, to composite materials that include a matrix material and carbon nanotube (CNT)-infused fiber materials. The inclusion of CNT-functionalized fiber materials in a composite allows larger CNT loadings in matrix materials which have previously been limited by increases in viscosity with increased CNT loading. The larger possible CNT loading, coupled with a high degree of control over relative CNT orientation, increases the impact of CNT properties imparted to the overall composite material. The control over how the CNT-infused fiber material is disposed within the composite matrix material provides access to sophisticated hybrid composite materials that are readily tailored to specific target needs, such as improved mechanical, electrical, and thermal properties.

CNT orientation in the composite is controlled, in part, by the fiber material scaffold onto which the CNTs are infused. As described further below, there are two basic orientations of the infused CNTs relative to the axes of individual fiber of the fiber material. In some embodiments, the CNTs are displayed radially about the fiber axes. In such embodiments, the CNTs are grown generally perpendicularly from the fiber axes. In other embodiments, the CNT-infused fiber undergoes further treatment to orient the CNTs generally parallel to the fiber axis. These fixed orientations of the CNTs on the fiber material lead to predictable orientations of the CNTs in the overall composite structure.

Figure 12:
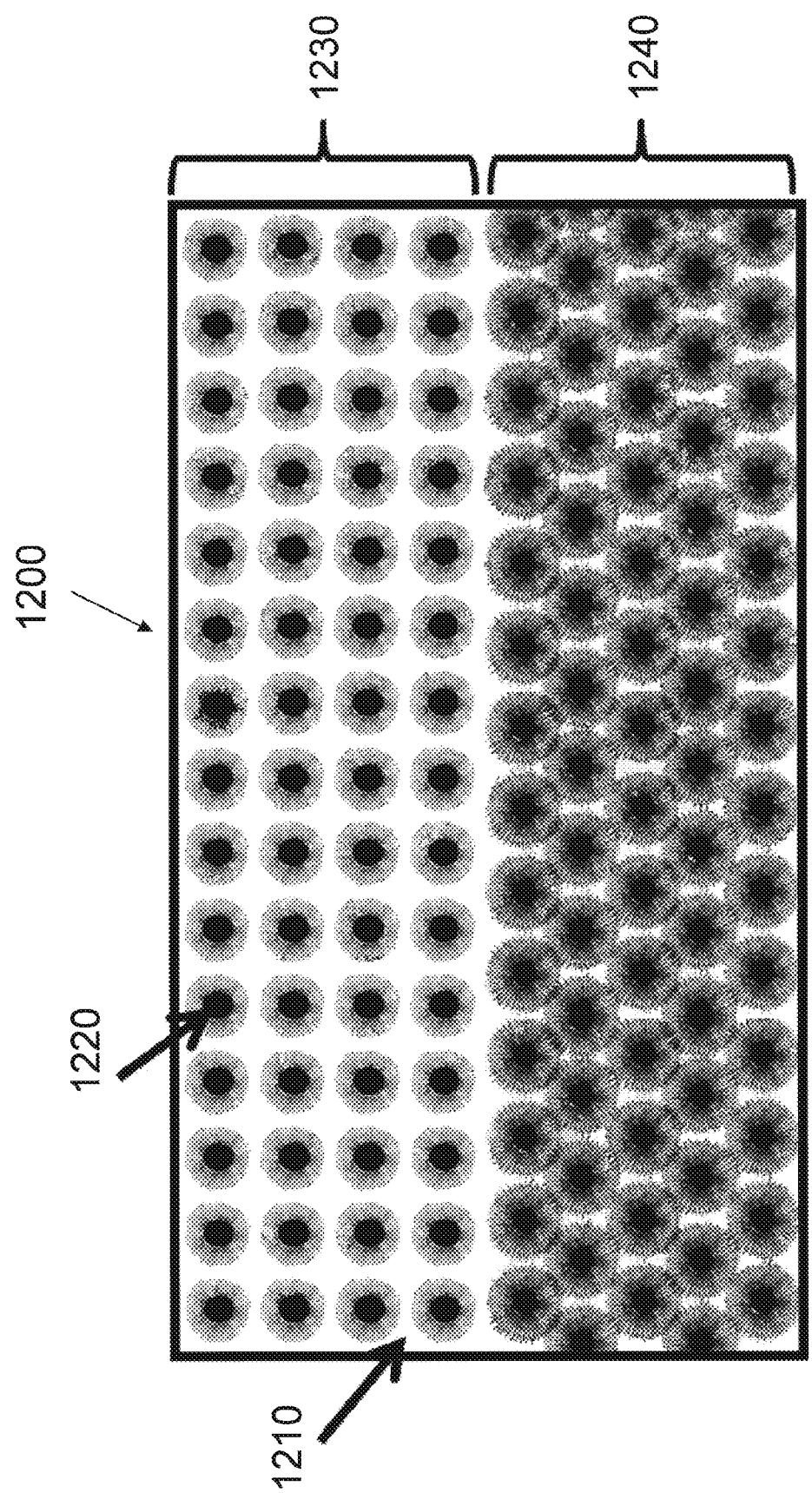
FIG. 12 shows a tailored fiber-reinforced composite structure utilizing two types of CNT-infused fibers in different portions of the composite structure. The top lamina shows CNTs of a relatively shorter length than the CNTs of the lower lamina.

The composite structures of the invention can also incorporate CNT-infused fiber materials having different CNT types in different portions of the overall composite. For example, shorter CNTs can be incorporated into portions of a composite structure to enhance mechanical properties. CNTs with longer lengths can be incorporated into other portions of the same composite structure to enhance electrical or thermal properties. The incorporation of different types of CNT-infused fiber materials in a composite structure is exemplified in FIG. 12. FIG. 12 show composite structure 1200 which includes a matrix material 1210 and CNT-infused fiber material 1220. In this exemplary structure, a first layer 1230 of composite structure 1200 has CNTs of short length which can be effective in providing mechanical strength to this portion of composite structure 1200. A second layer 1240 incorporates CNT-infused fiber materials having relatively longer CNT lengths. As shown in the figure, the CNT can be of sufficient length to generate percolation pathways which can be useful to realize beneficial electrical and/or thermal conductivity properties in second layer 1240 of composite structure 1200. In some embodiments, the composite structures of the invention can also include sections of fiber material reinforcement that are devoid of any infused CNTs.

Fiber reinforced composite structures of the present invention are useful because their properties can be tailored to fulfill a given set of requirements as exemplified in FIG. 12. As a further example, a particular lamina stacking sequence can be used to optimize a composite beam for flexural stiffness or another sequence can be used to optimize for torsional rigidity. Hybrid composites, which utilize two or more different types of reinforcement fiber, benefit from the positive contributions of each fiber towards overall composite properties, whether they are mechanical, thermal or electrical.

Composite structures made by processes disclosed herein, with CNT infused fibers, have shown increased mechanical properties, including in shear—interlaminar and in-plane. Additionally these composite structures have improved electrical and thermal conductivity, based, in part, on good CNT loading and control of CNT orientation. The CNT infused fibers disclosed herein can be used in composite structures in various orientations and locations to provide custom tailored properties, including properties not available to current fiber-reinforced composite materials. For example, processes of the invention can produce a composite structure to handle high shear loading in the central planes, but is electrically insulated across the thickness. CNT-infused fibers can be used for the central lamina of a tailored composite to improve the maximum shear strength characteristics. Unmodified glass fibers can be used in surface layers to provide the electrical insulation properties.

In still further exemplary embodiments, tailored composites can utilize the improved electrical properties of the CNT-infused fibers in a variety of contexts. For example, a composite wing subjected to icy conditions can have some layers made with CNT-infused fibers, such that a large circuit is created when an electrical potential is applied. This layer acts as a large resistive heater to heat, remove, or prevent icy conditions. This avoids the need for external heating and the composite retains homogeneity because only two types of fiber are being used. A second fiber type (or the same fiber type) with different CNT types can be employed within the same composite to provide additional strength, without increasing processing steps in the composite manufacture. The compatibility between the CNT-infused fibers and any unmodified fibers reduces the possibility of critical defects forming during the layup of the composite based on mismatches in coefficient of thermal expansion, size and stiffness variations of other heating elements.

Similarly, a composite component can be designed to handle a variety of loadings. For example, one component can have a joint which carries a shear load while another portion supports a compressive load. The portion subject to shear and susceptible to delamination failure can be made with CNT-infused fibers with a high loading of CNTs for increased shear stiffening effect. The portion of the part supporting a tensile load can utilize fibers with a lower CNT coverage to provide a higher strength based on the associated higher fiber volume. The control of the CNT infusion on the fiber is readily tailored prior to composite formation, simplifying the composite production process.

Furthermore, the CNT-infused fibers described herein can be produced in a continuous fashion with precise control of the CNT loading, CNT length, and CNT orientation. Other hybrid composite systems which incorporate nanoscale reinforcement require additional processing steps to properly disperse the nanoparticles of nanotubes into the matrix. By having the CNTs infused to a fiber material as a carrier, distribution, orientation and types of the CNTs are controlled. Methods of the present invention also allow the user to create a lamina with specific CNT loading, different from a next layer as controlled by the CNT-infusion process, described herein below.

The CNT-infused fibers can be incorporated into a composite using the same manufacturing techniques used for un-processed glass and carbon filaments, for example, without the need for extra processing steps including orienting the CNTs or sectional layering in multilayered composites. Moreover, because the CNTs are infused to a fiber carrier, the issues associated homogeneous incorporation of CNTs, CNT bundling, and the like, are alleviated. CNT-infused fibers allow resin-based composite structures to have larger CNT loading than can be achieved by simply mixing CNTs directly with the composite matrix material.

In currently manufactured composites, it is typical to have a 60% fiber material to 40% matrix volume ratio, however the introduction of a third element, that is the infused CNTs on the fiber material, allows these ratios to be altered. For example, with the addition of up to about 25% CNTs by volume, the fiber portion can vary between about 10% to about 75% with the matrix range changing to between about 15% to about 85%. The various ratios can alter the properties of the overall composite, which can be tailored to target one or more desired characteristics. The properties of CNTs lend themselves to fiber materials that are reinforced with them. Utilizing these enhanced fibers in tailored composites similarly imparts increases that will vary according to the fiber fraction, but can still greatly alter the properties of tailored composites compared to those know in the art.

As used herein the term "fiber material" refers to any material which has a fiber or filament as its elementary structural component. Fiber is a unit of matter, either natural, or manufactured, which forms the basic element of fabrics and other textile structures. Filament is a single fiber of an indefinite length, either natural or manufactured. As used herein, the terms "fiber" and "filament" can be used interchangeably. The term "fiber material" encompasses fibers, filaments, yarns, tows, tapes, ribbons, woven and non-woven fabrics, plies, mats, 3D woven structures, and the like.

As used herein the term "spoolable dimensions" refers to fiber materials having at least one dimension that is not limited in length, allowing for the material to be stored on a spool or mandrel. Fiber materials of "spoolable dimensions" have at least one dimension that indicates the use of either batch or continuous processing for CNT infusion as described herein. An exemplary fiber material of spoolable dimensions that is commercially available is exemplified by AS4 12 k carbon fiber tow with a tex value of 800 (1 tex=1 g/1,000 m) or 620 yard/lb (Grafil, Inc., Sacramento, Calif.). Commercial carbon fiber tow, in particular, can be obtained in 5, 10, 20, 50, and 100 lb. (for spools having high weight, usually a 3 k/12K tow) spools, for example, although larger spools may require special order. Processes of the invention operate readily with 5 to 20 lb. spools, although larger spools are usable. Moreover, a pre-process operation can be incorporated that divides very large spoolable lengths, for example 100 lb. or more, into easy to handle dimensions, such as two 50 lb spools. Similarly spoolable lengths of glass, ceramic, metal, and organic fiber materials, such as aramid fiber materials, are readily available and known to those of skill in the art. As described above any fiber material can be supplied in the form of tows, rovings, fabrics, and the like.

As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials. CNTs also include those that result from various functionalization chemistry, as known in the art. Examples include, without limitation, CNT fluorination and oxidation with oxidizing acids such as nitric acid. Such functionalization chemistry is performed after growth of the CNTs on the fiber material. One skilled in the art will recognize the compatibility of any functionalization chemistry with the fiber material itself.

As used herein "uniform in length" refers to length of CNTs grown on a fiber material in a reactor. "Uniform length" means that the CNTs have lengths with tolerances of plus or minus about 20% of the total CNT length or less, for CNT lengths varying from between about 1 micron to about 500 microns. At very short lengths, such as 1-4 microns, this error may be in a range from between about plus or minus 20% of the total CNT length up to about plus or minus 1 micron, that is, somewhat more than about 20% of the total CNT length.

As used herein "uniform in distribution" refers to the consistency of density of CNTs on a fiber material. "Uniform distribution" means that the CNTs have a density on the fiber material with tolerances of plus or minus about 10% coverage defined as the percentage of the surface area of the fiber covered by CNTs. This is equivalent to ±1500 CNTs/$\mu m^2$ for an 8 nm diameter CNT with 5 walls. Such a figure assumes the space inside the CNTs as finable.

As used herein, the term "infused" means bonded and "infusion" means the process of bonding. Such bonding can involve direct covalent bonding, ionic bonding, pi-pi, and/or van der Waals force-mediated physisorption. For example, in some embodiments, the CNTs can be directly bonded to the carbon fiber material. Bonding can be indirect, such as the CNT infusion to the fiber material via a barrier coating and/or an intervening transition metal nanoparticle disposed between the CNTs and carbon fiber material. In the CNT-infused fiber materials disclosed herein, the carbon nanotubes can be "infused" to the fiber material directly or indirectly as described above. The particular manner in which a CNT is "infused" to a fiber materials is referred to as a "bonding motif."

As used herein, the term "transition metal" refers to any element or alloy of elements in the d-block of the periodic table. The term "transition metal" also includes salt forms of the base transition metal element such as oxides, carbides, nitrides, and the like.

As used herein, the term "nanoparticle" or NP (plural NPs), or grammatical equivalents thereof refers to particles sized between about 0.1 to about 100 nanometers in equivalent spherical diameter, although the NPs need not be spherical in shape. Transition metal NPs, in particular, serve as catalysts for CNT growth on the fiber materials.

As used herein, the term "sizing agent," "fiber sizing agent," or just "sizing," refers collectively to materials used in the manufacture of fibers as a coating to protect the integrity of fibers, provide enhanced interfacial interactions between a fiber and a matrix material in a composite, and/or alter and/or enhance particular physical properties of a fiber. In some embodiments, CNTs infused to fiber materials behave as a sizing agent.

As used herein, the term "matrix material" refers to a bulk material than can serve to organize sized CNT-infused fiber materials in particular orientations, including random orientation. Because the CNT-infused fiber materials generally organize the CNTs, such random orientation can be obtained, for example, by use of chopped strands of CNT-infused fiber materials. The matrix material benefits from the presence of the CNT-infused fiber material by imparting some aspects of the physical and/or chemical properties of the CNT-infused fiber material to the matrix material.

As used herein, the term "material residence time" refers to the amount of time a discrete point along a fiber material of spoolable dimensions is exposed to CNT growth conditions during the CNT infusion processes described herein. This definition includes the residence time when employing multiple CNT growth chambers.

As used herein, the term "linespeed" refers to the speed at which a fiber material of spoolable dimensions can be fed through the CNT infusion processes described herein, where linespeed is a velocity determined by dividing CNT chamber(s) length by the material residence time.

In some embodiments, the present invention provides a composite composition that includes a plurality of carbon nanotube (CNT)-infused fibers dispersed in a matrix material. The amount of carbon nanotubes in the composition can be in a range between about 5 percent by weight to about 60 percent by weight of the composite. The high loading of CNTs in a composite material is independent of the matrix material type. Thus, for example, even resin matrix materials that have typically poor CNT loadings due to viscosity increases, can now incorporate higher CNT loadings. In some embodiments, the CNT loadings can be even higher, for example, 65%, 70%, or 75% including any amount in between. In some embodiments the loadings can be lower than 5% including 0.1%, 0.25%, 0.5%, 1%, 2%, 3%, 4% and 5%, including any amount in between.

The composite composition can also have an amount of carbon nanotubes in a range between about 0.1 percent to about 5 percent by weight of the composite, between about 10 percent to about 60 percent by weight of the composite, between about 15 percent to about 60 percent by weight of the composite, between about 20 percent to about 60 percent by weight of the composite, between about 25 percent to about 60 percent by weight of the composite, between about 10 percent to about 50 percent by weight of the composite, between about 20 percent to about 40 percent by weight of the composite, between about 5 percent to about 10 percent by weight of the composite, between about 10 percent to about 20 percent by weight of the composite, between about 20 percent to about 30 percent by weight of the composite, between about 30 percent to about 40 percent by weight of the composite, between about 40 percent to about 50 percent by weight of the composite, between about 50 percent to about 60 percent by weight of the composite, and between about 40 percent to about 60 percent by weight of the composite, including any ranges within these ranges. One skilled in the art will recognize that the choice of range is influenced by the end application of the composite material. For example, a pre-preg can have relatively more CNT-infused fiber relative to matrix material resulting in a higher effect CNT weight percent in the overall composite. The amount of CNTs can also depend on whether the end use of the composite is for thermal, electrical, or mechanical applications, or combinations of these applications.

In some embodiments, the composite composition has an amount of carbon nanotubes in the composition that is about 5 percent by weight of the composite, and in other embodiments, about 15 percent by weight of the composite, in still further embodiments, about 20 percent by weight of the composite, in still further embodiments, about 25 percent by weight of the composite, in yet still further embodiments, about 30 percent by weight of the composite, and about 35 percent by weight of the composite in other embodiments. The amount of CNTs in a final composite can be any amount desired between about 0.1% to about 75% and any value in between or fractions thereof.

The fiber materials useful in the practice of the present invention include any of a variety of different types of chemical makeup, including, without limitation: carbon fiber, graphite fiber, metallic fiber (e.g., steel, aluminum, molybdenum, tantalum, titanium, tungsten, etc.), tungsten monocarbide, ceramic fiber, basalt fiber, metallic-ceramic fiber (e.g., aluminum silica, etc.), glass fiber (E-glass, S-glass, D-glass), cellulosic fiber, polyamide (aromatic polyamide, Aramid, such as Kevlar 29 and Kevlar 49, polyester, quartz, silicon carbide. The methods described in detail below can be adapted to grow carbon nanotubes on any fiber type substrate. CNT-infused glass fiber materials are exemplary of the fiber-types used as a reinforcing material in a tailored composite composition of the invention. The CNT-infused fibers can take the form of a fiber tow, a plurality of rovings, a fabric or numerous other forms as described herein.

As with the fiber-type, the matrix material can be of any type including ceramic, metal, thermosets, thermoplastics, and the like. One skilled in the art will recognize the ability to choose appropriate pairings of fiber types and matrix materials, depending on the end use of the composite product. Exemplary combinations of fiber type and matrix material include, for example, an epoxy with carbon fibers, an epoxy with glass fibers, a variety of thermoset matrices including epoxies, polyesters, and maleimides with carbon, glass, ceramic, and/or aramid fibers, ceramic matrices including silicon carbide and alumina with carbon, glass, ceramic, and aramid fibers, a variety of thermoplastics including polyethylenes, polyimides, polyamides, PMMA, PEEK, PEI, PAN, and the like with carbon, glass, ceramic, and/or aramid fibers, metals including aluminum and magnesium with glass, carbon, and ceramic fibers.

The CNT-infused fiber materials can be incorporated into the matrix materials using methods known in the art including, for example, injection molding, compression molding, vacuum infusion, pultrusion, extrusion, hand layup (open molding), resin transfer molding, vacuum assisted resin transfer molding, and the like. Depending on the method employed various configurations of composite structure are accessible.

In some embodiments, the CNT-infused fibers are distributed homogenously throughout the matrix material. In such embodiments, the CNT-infused fiber can be substantially evenly distributed and evenly aligned, with CNTs of substantially similar length throughout the matrix material resulting in a substantially regular arrangement of CNTs evenly throughout the composite structure.

In some embodiments, the composite structures of the invention can have CNT lengths that differ in at least two portions within the composite structure. Referring back to FIG. 12, layer 1230 is created with a CNT-infused fiber material 1220 having CNTs of a length shorter than in layer 1240. In such an arrangement, first layer 1230 with shorter CNTs can serve to improve mechanical properties, while second layer 1240 serves to improve electrical and/or thermal properties, such as EMI shielding. The lengths of the CNTs for the such applications are described herein further below. Given the teachings and guidance provided herein, one of ordinary skill in the art will recognize that CNT lengths can be varied in more than two layers, including three layers, four layers, five layers, six layers, and so on, up to any number of layers throughout the composite. Each such layer within the composite can be selected for any mechanical, electrical, and/or thermal property, such layers appearing in any order.

Moreover, one skilled in the art will recognize that CNT lengths need not exist in quantized steps, but rather can be gradually altered throughout the composite continuously. In some such embodiments, the gradient of CNT lengths can be continuously increasing across the composite from top to bottom. In some embodiments, the gradient of CNT lengths can be continuously decreasing from top to bottom. In yet further embodiments, the CNT lengths can be continuously increasing and then decreasing periodically throughout the composite structure.

Either continuous or quantized composite structures are readily accessed via any composite manufacture process with predetermined positioning for the lay up of the CNT-infused fiber material within the composite structure. With knowledge of the what regions of the structure have targeted mechanical, electrical, and/or thermal requirements, those of skill in the art can synthesize the CNTs on the fiber material in accordance with the targeted CNT lengths along a length of spoolable fiber material.

In some embodiments, the same effect of quantized or continuous CNT lengths can be achieved with multiple separate lengths of spoolable fiber materials. In some such embodiments, the spoolable fiber materials can also be made of different materials. Thus, for example, a first layer within a composite can incorporate CNT-infused glass fiber materials with short CNT lengths for mechanical strength enhancement, while a second layer incorporates CNT-infused carbon fiber materials for electrical and/or thermal applications.

The CNTs on the CNT-infused fiber materials are readily oriented in a pattern. For example, in some embodiments, the infused CNTs are disposed radially about the fiber axes, while in other embodiments the infused CNTs are disposed parallel to the fiber axes. Radial growth of CNTs about the fiber material is achieved by the CNT growth methods described herein below. When radial orientation relative the fiber axis is desired, no post CNT growth processing is required. In some applications it can be desirable to have the CNTs laying along the fiber axis. In such embodiments, after CNT growth, the CNT-infused fiber material can be treated with various solutions for "chemical" orienting of the infused CNTs. The CNTs can also be redirected along the fiber axis by mechanical or electromechanical means, or any combination of the aforementioned methods, all of which are well known in the art and are described herein below.

Electromechanical—Via the use of an electric or magnetic field aligned parallel to the fiber during the growth process, CNTs can be aligned while they are grown by inducing alignment via the force field applied.

Mechanical—A variety of mechanical techniques including extrusion, pultrusion, gas pressure aided dies, conventional dies, and mandrels can be used to apply a shearing force in the direction of the fibers to induce alignment.

Chemical—Chemicals including solvents, surfactants, and micro-emulsions can be used to induce alignment via a sheathing effect in the direction of the fibers observed as material is drawn out of these chemicals.

Figure 13:
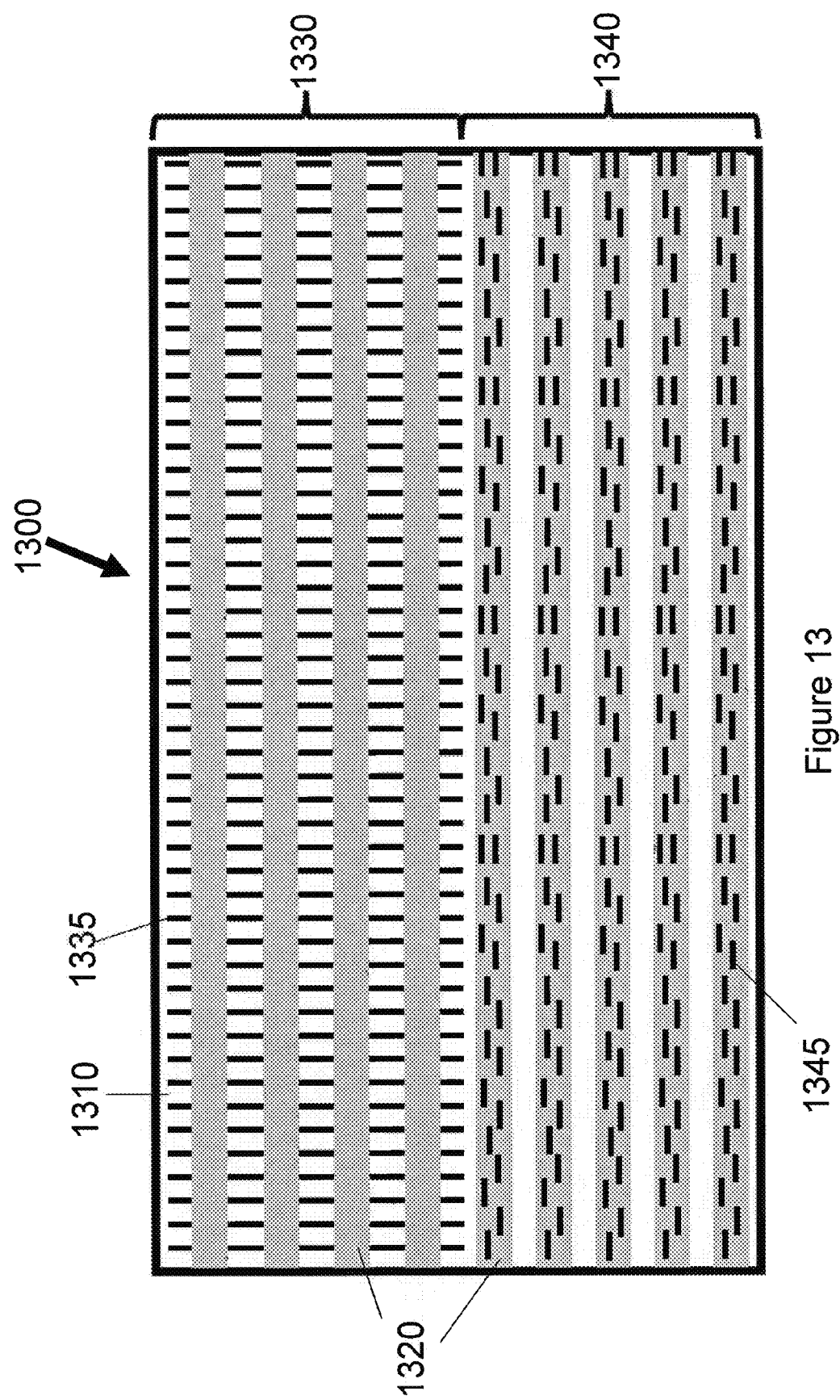
FIG. 13 shows a tailored fiber-reinforced composite structure utilizing two types of CNT-infused fibers in different portions of the composite structure. The top lamina shows CNTs generally perpendicular to the fiber axis while the lower lamina shows CNTs generally parallel to the fiber axis.

In some embodiments, reorienting of the CNTs to lay along the fiber axes of the fiber material can be achieved during the composite manufacturing process. Thus, for example, mechanical means can be employed during lay up of the CNT-infused fiber material within the composite structure to provide any section of a spoolable length of CNT-infused fiber material with CNTs that lay parallel to the fiber axes. This can provide an overall composite structure having varied CNT orientations throughout the structure. In some embodiments, CNT alignment differs in at least two portions of the composite structure. The CNTs can be oriented within a composite structure such that the infused CNTs are substantially parallel to the fiber axes, substantially, perpendicular to the fiber axes, or mixtures thereof, as described above. Referring now to FIG. 13, a composite structure 1300 can include a matrix material 1310 and a CNT-infused fiber material 1320 employed in a first layer 1330 having CNTs 1335 oriented radially about the fiber axes and a second layer 1340 adjacent to the first layer can have CNTs 1345 that are oriented along the fiber axes. As in the case of varied CNT lengths, the sections of different CNT orientations relative to the fiber material can exist along a single length of spoolable fiber material or two or more lengths of spoolable fiber material, each of which can be identical or of mixed type, such as carbon, glass, ceramic, metal, or aramid fiber material. In composite structure 1300, the orientation of CNTs 1325 in first layer 1330 can be used for improved interlaminar properties such as increased shear strength or toughness. This can be useful in lap joints or areas where structures are bonded together. Second layer 1340 having CNTs 1345 oriented in a direction parallel to the fiber axes can be used in applications for enhanced tensile properties.

Figure 14:
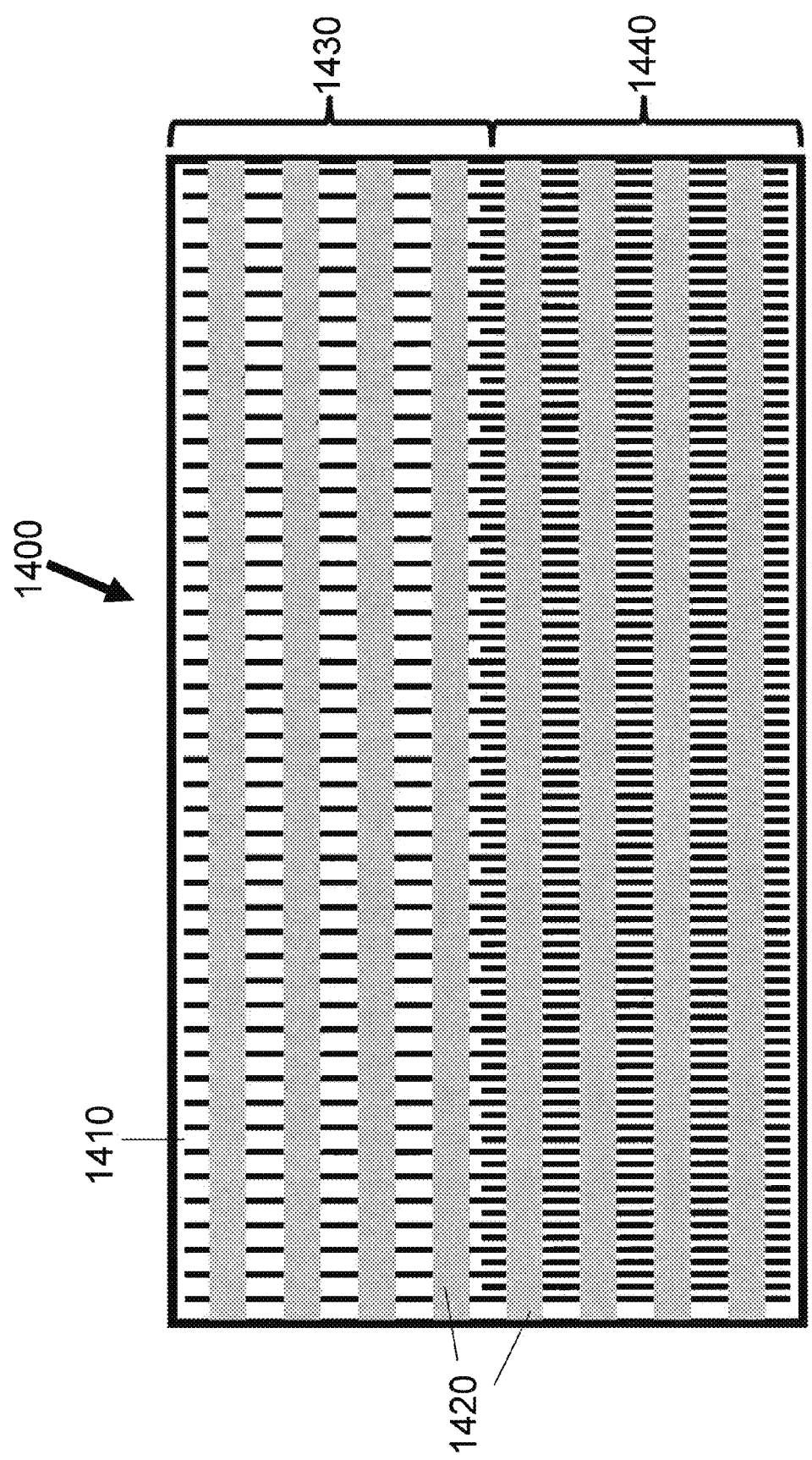
FIG. 14 shows tailored fiber-reinforced composite structure utilizing two types of CNT-infused fibers in different portions of the composite structure. The top lamina shows CNTs of a relatively lower density than the CNTs of the lower lamina.

In some embodiments, the composite structures of the invention can have a CNT density that differs in at least two portions of the composite structure. Thus, for example, the CNTs in the overall composite can be present in a concentration gradient throughout a portion of the matrix material. Thus, in some embodiments, a spoolable length of CNT-infused fiber can be manufactured with differing densities along the length of spoolable fiber. This can be controlled by the CNT growth process which is a continuous in-line process as described further below. The location and density of CNTs in a composite structure can be designed with foreknowledge of how the CNT-infused fiber will lay up in the matrix material, including accommodating any geometrical parameters. Referring now to FIG. 14, there is shown a composite structure 1400 that includes matrix material 1410 which incorporates a CNT-infused fiber material 1420. CNT-infused fiber material 1420 lays up in composite structure 1400 in a first layer 1430 having a first density of CNTs throughout first layer 1430 and a second layer 1440 having a second density of CNTs throughout second layer 1440. In composite structure 1400, first layer 1430, with low density CNTs, can be used to enhance mechanical properties. Moreover, a configuration near a percolation threshold can provide a sensitive electrical response to strain which can be used to detect damage within composite structure 1400. The higher CNT density of second layer 1440 can be used for any combination of mechanical, thermal, and electrical properties. For example the higher density can be useful to enhance thermal transport characteristics.

Given the teachings and guidance provided herein, one of ordinary skill in the art will recognize that CNT density can also be varied in more than two layers, including three layers, four layers, five layers, six layers, and so on, up to any number of layers throughout the composite. Each such layer within the composite can be selected for any mechanical, electrical, and/or thermal properties, and each of these layers can appear in any order.

Moreover, one skilled in the art will recognize that CNT density need not exist in quantized steps as shown in FIG. 14, but rather can be gradually altered throughout the composite continuously. In some such embodiments, the gradient of CNT density can be continuously increasing across the composite from top to bottom. In some embodiments, the gradient of CNT density can be continuously decreasing from top to bottom. In yet further embodiments, the CNT density can be continuously increasing and then decreasing periodically throughout the composite structure.

Either continuous or quantized composite structures with varied CNT density are readily accessed via any composite manufacture process with predetermined positioning for the lay up of the CNT-infused fiber material within the composite structure. With knowledge of the what regions of the structure have targeted mechanical, electrical, and/or thermal requirements, those of skill in the art can synthesize a density of CNTs on the fiber material in accordance with the targeted properties along a length of spoolable fiber material.

In some embodiments, the same effect of quantized or continuous CNT lengths can be achieved with multiple separate lengths of spoolable fiber materials. In some such embodiments, the spoolable fiber materials can also be made of different materials. Thus, for example, a first layer within a composite can incorporate CNT-infused glass fiber materials with one density of CNTs for mechanical strength enhancement, while a second layer incorporates CNT-infused carbon fiber materials for electrical and/or thermal applications.

In some embodiments, the CNT-infused fibers can be distributed substantially only near the surface of the composite structure. In such embodiments, the CNT-infused fiber can also include an extended fiber section that is devoid of CNTs. Thus, while the surface displays the CNTs, the reinforcing fiber material devoid of CNTs can be distributed through the remaining composite structure.

Figure 15:
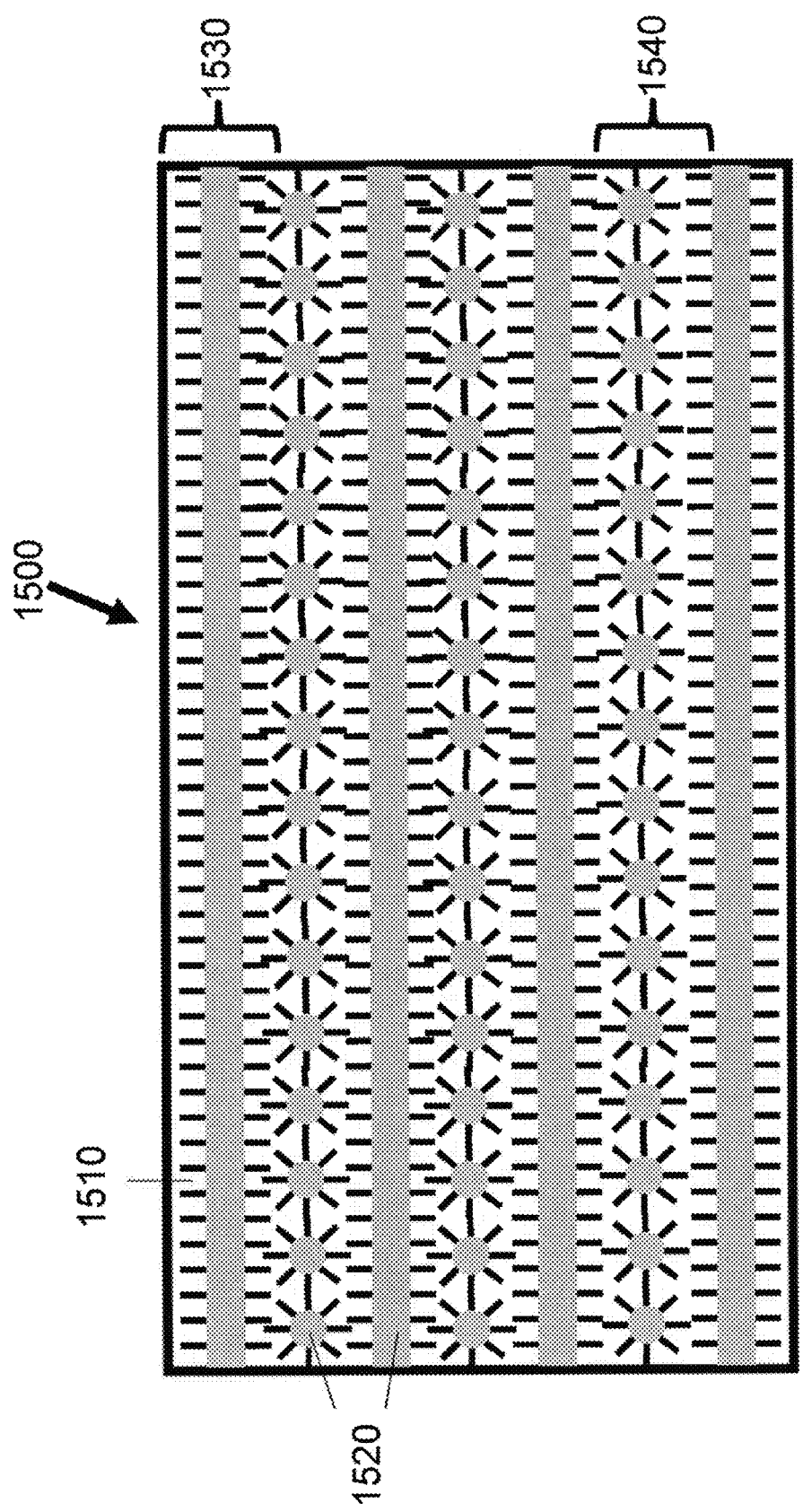
FIG. 15 shows tailored fiber-reinforced composite structure utilizing CNT-infused fiber orientations in different portions of the composite structure. The top-most lamina shows CNT-infused fibers parallel to the cross section while the alternate layer beneath shows CNT-infused fibers perpendicular to cross section.

The fiber material itself in the first and second layers of a composite structure can be in any relative orientation from zero (i.e. parallel) to ninety degrees (i.e. perpendicular), including any angle in between and fractions thereof. Thus, a first layer can be created with CNTs oriented radially about the fiber axes and a second layer can have the same CNT orientation with respect to the fiber axes, but the CNT-infused fiber materials in the first and second layers can be disposed in a non-parallel arrangement, at any relative angle between zero and ninety degrees, including any angle in between and fractions thereof. An exemplary configuration is shown in FIG. 15, wherein is shown a composite structure 1500 having a matrix material 1510 with CNT-infused fiber material 1520 disposed therein. CNT-infused fiber material 1520 is disposed within the matrix material in a manner creating a first layer 1530 and a second layer 1540 in which the fibers are arranged substantially perpendicular to each other. Such an arrangement can be achieved via a woven structure or discrete layers. In some embodiments, first layer 1530 and second layer 1540 are made of the same fiber type. In other embodiments, first layer 1530 and second layer 1540 are made of different fiber types. One skilled in the art will recognize that while composite structure 1500 shows alternating perpendicular layers, the structure can be layered in any order. For example, two or more layers having the fiber orientation of first layer 1530 can be placed adjacent to each other. Likewise, two or more layers having the fiber orientation of second layer 1540 can be placed adjacent to each other.

While FIG. 15 shows first layer 1530 and second layer 1540 having the same radial orientation of CNTs about the CNT-infused fiber material 1520, one skilled in the art will recognize that the orientation of the CNTS can also be varied to include an orientation that is parallel to the fiber axes.

Moreover, given the teaching guidance provided herein one skilled in the art will recognize that a composite structure can have any combination of CNT lengths, CNT densities, CNT alignments, and fiber material alignments in at least two portions of the composite structure. Any differing properties can be designed into a single spoolable length of fiber or can be created from separate spoolable lengths. In some embodiments, mixed fiber types can be employed as well. These can provide targeted mechanical, electrical, and/or thermal properties at various portions of the composite structure resulting in a highly tailored composite structure with exquisite control of the nanomaterial reinforcement.

In the CNT-infusion processes, fiber materials are modified to provide a layer (typically no more than a monolayer) of CNT-initiating catalyst nanoparticles on the fiber. The catalyst-laden fiber is then exposed to a CVD-based process used to grow CNTs continuously, in line. The CNTs grown are infused to the fiber material. The resultant CNT-infused fiber material is itself a composite architecture.

In some embodiments, the CNT-infusion process includes the operations of: 1) removing sizing from the fiber material, if sizing is present; 2) applying nanotube-forming catalyst to the fiber material; 3) heating the fiber material to nanotube-synthesis temperature; and 4) directing a reactive carbon source onto the catalyst-laden parent filament.

Suitable CNT forming catalysts include colloidal solutions of typically nanometer-sized particles (e.g., 10 nanometers in diameter, etc.), usually of a transition metal. Suitable colloidal solutions include those of: a) iron nanoparticles; b) iron oxide; c) iron nitrate; d) cobalt; e) cobalt oxide; f) cobalt nitrate; g) nickel; h) nickel oxide; i) copper; j) copper oxide; k) metal salt solutions; l) mixtures and alloys of items a) through k). The colloidal solutions can be formed from water or solvents, including, without limitation, acetone, hexane, isopropyl alcohol, toluene, and ethanol. In some embodiments, the catalyst, which can be a transition metal catalyst, is added to the plasma feedstock gas as a precursor in the form of a ferrofluid, a metal organic, metal salt or other composition for promoting gas phase transport. In some other embodiments, the transition metal catalyst is deposited on the parent fiber using evaporation techniques, electrolytic deposition techniques, suspension dipping techniques and other methods known to those skilled in the art. The catalyst can be applied at room temperature in the ambient environment (neither vacuum nor an inert atmosphere is required). In some embodiments, the nanoparticle CNT catalyst can be generated in situ on the fiber material by creating nanoparticle islands as known in the art.

In some embodiments, the infused carbon nanotubes are single-wall carbon nanotubes. In some embodiments, the infused carbon nanotubes are double-wall carbon nanotubes. In some embodiments, the infused carbon nanotubes are multi-wall nanotubes. In some embodiments, the infused carbon nanotubes are a combination of single-wall, double-wall, and multi-wall nanotubes. There are differences in the characteristic properties of single-wall, double-wall and multi-wall nanotubes that, for some end uses of the fiber material, dictate the synthesis of one or the other type of nanotube. For example, single-walled nanotubes can be designed as semiconductors, whereas multi-walled nanotubes are conducting. The diameters of the synthesized carbon nanotubes are related to the size of the metal nanoparticle catalyst used for their growth.

A desired CNT loading can be achieved by growing relatively longer CNTs at a relatively lower density (greater spacing) on the parent fiber and/or growing relatively shorter CNTs at a relatively higher density (adjacent CNTs closer to one another) on the parent fiber. CNT loading can also be controlled by growing long dense CNTs and/or short sparse CNTs. The loading is a property of the CNT length and density. The decision to achieve the loading via CNT length and/or density is a function of any number of factors, including, for example, the desired properties of the composite. For example, composites having fibers with relatively longer CNTs provide good EMI absorption and protection from solar radiation. A desired CNT density is achieved, in part, as a function of catalyst application (the amount/size of catalyst particles on the fiber) and CNT length is a function of growth time in the CNT synthesis reactor. Other characteristics of CNTs, such as, CNT diameter and type (e.g., single wall vs. multi-wall), are controllable by, for example, catalyst particle size.

Carbon nanotube synthesis occurs in a CNT-growth reactor. In some embodiments, the synthesis process is a plasma-based process (e.g., plasma-enhanced chemical vapor deposition, etc.) wherein carbon plasma is sprayed onto the catalyst-laden fibers. In some embodiments, a thermal CVD process is used for carbon nanotube synthesis.

Since carbon nanotube growth occurs at elevated temperatures (typically in a range of about 500 to 1000° C. as a function of the catalyst), the catalyst-laden fibers can be optionally pre-heated. For the infusion process, the fibers can be heated until they soften, depending on the fiber type. Any of a variety of heating elements can be used to heat the fibers, such as, without limitation, infrared heaters, a muffle furnace, and the like.

After any pre-heating of the fiber material, the fibers are ready to receive the reactive carbon feedstock. In some embodiments, this can be a carbon plasma. The carbon plasma can be generated, for example, by passing a carbon containing gas (e.g., acetylene, ethylene, ethanol, etc.) through an electric field that is capable of ionizing the gas. This cold carbon plasma is directed, via spray nozzles, to the fibers. The fibers are within about 1 centimeter of the spray nozzles to receive the plasma. In some embodiments, heaters are disposed above the fibers at the plasma sprayers to maintain the elevated temperature of the fiber. As a consequence of the exposure of the catalyst to the carbon plasma, CNTs grow on the fibers.

In some embodiments, the reactive carbon feedstock can be provided by a thermal CVD process. In such a case, a carbon feedstock and/or a carrier gas (an inert carrier such as argon or nitrogen) can be optionally, pre-heated to generate reactive carbon species for transition metal mediated-CNT growth. This process is described herein further below.

For a continuous manufacturing process, the CNT-infused fibers can be spooled at a fiber take-up spooling station. The CNT-infused fiber is then ready for use in any of a variety of applications, including, without limitation, for use as the reinforcing material in composite materials. Generally, the entire process can be automated and computer controlled. The amount of CNTs growth can be varied along a single length of spoolable fiber material. Thus, for example, where longer CNTs are desired, the fiber material can be subjected to long growth times in a single CNT growth chamber, or can be subjected to multiple tandem growth chambers. Parameters such as carrier and carbon feedstock flow rates, temperatures, linespeeds, and the like can all be altered and controlled by computer to generate a spoolable length of fiber material with any density of CNT having any targeted lengths, across any portion of the fiber material. As described above, this control exerted over the CNT synthesis on the fiber and the foreknowledge of how the CNT-infused fiber material will lay up in the final product, allows the user to determine what composite properties will be enhanced in the overall structure and in particular regions of the composite structure.

To create composite compositions and finished composite materials, the CNT-infused fiber is subjected to further operations. In some embodiment, the CNT-infused fiber can be delivered to a resin bath. The resin bath can contain resin for the production of a composite material that includes the CNT-infused fiber and a resin. Any one of a variety of resins, such as general purpose polyester (e.g., orthophthalic polyesters, etc.), improved polyester (e.g., isophthalic polyesters, etc.), epoxy, and vinyl ester can suitably be used for this purpose.

Using CNT-infused fiber materials, composite compositions having CNT loadings as high as 60 weight percent have been demonstrated. A resin bath can be implemented in a variety of ways, such as, for example, a doctor blade roller bath, an immersion bath, or any other way known to those skilled in the art. The resin-wetted, CNT-infused fiber can be further processed as desired, such as via a filament winding process, or the like. It will be understood that composite compositions can include CNT-infused fiber materials, such as tows formed from CNT-infused fibers, roving formed from CNT-infused fibers, fabric formed from CNT-infused fibers, and the like.

The CNT-infused fiber material can be tailored with specific types of CNTs on the surface of fiber such that various properties can be achieved. For example, the electrical properties can be modified by applying various types, diameter, length, and density CNTs on the fiber. CNTs of a length which can provide proper CNT to CNT bridging is used to create percolation pathways which improve composite conductivity. Because fiber spacing is typically equivalent to or greater than one fiber diameter, from about 5 to about 50 microns, CNTs can be at least this length to achieve effective electrical pathways. In some embodiments, the amount of CNTs needed for electrical pathways is controlled by the loading which can be any amount greater than about 0.1% for the percolation threshold. Shorter length CNTs can be used to enhance structural properties.

In some embodiments, a CNT-infused fiber material includes CNTs of varying lengths along different sections of the same fiber material. When used as a tailored composite reinforcement, such multifunctional CNT-infused fibers enhance more than one property of the composite in which they are incorporated.

In some embodiments, a first amount of carbon nanotubes is infused to the fiber material. This amount is selected such that the value of at least one property selected from the group consisting of tensile strength, Young's Modulus, shear strength, shear modulus, toughness, compression strength, compression modulus, density, EM wave absorptivity/reflectivity, acoustic transmittance, electrical conductivity, and thermal conductivity of the carbon nanotube-infused fiber material differs from the value of the same property of the fiber material itself. Any of these properties of the resultant CNT-infused fiber material can be imparted to the final composite.

Tensile strength can include three different measurements: 1) Yield strength which evaluates the stress at which material strain changes from elastic deformation to plastic deformation, causing the material to deform permanently; 2) Ultimate strength which evaluates the maximum stress a material can withstand when subjected to tension, compression or shearing; and 3) Breaking strength which evaluates the stress coordinate on a stress-strain curve at the point of rupture. Composite shear strength evaluates the stress at which a material fails when a load is applied perpendicular to the fiber direction. Compression strength evaluates the stress at which a material fails when a compressive load is applied.

Multiwalled carbon nanotubes, in particular, have the highest tensile strength of any material yet measured, with a tensile strength of 63 GPa having been achieved. Moreover, theoretical calculations have indicated possible tensile strengths of CNTs of about 300 GPa. Thus, CNT-infused fiber materials are expected to have substantially higher ultimate strength compared to the parent fiber material. As described above, the increase in tensile strength will depend on the exact nature of the CNTs used as well as the density and distribution on the fiber material. CNT-infused fiber materials can exhibit a two to three times increase in tensile properties, for example. Exemplary CNT-infused fiber materials can have as high as three times the shear strength as the parent unfunctionalized fiber material and as high as 2.5 times the compression strength. Such increases in the strength of the reinforcing fiber material translate to increased strength in a composite in which the CNT-infused fiber is incorporated.

Young's modulus is a measure of the stiffness of an isotropic elastic material. It is defined as the ratio of the uniaxial stress over the uniaxial strain in the range of stress in which Hooke's Law holds. This can be experimentally determined from the slope of a stress-strain curve created during tensile tests conducted on a sample of the material.

Electrical conductivity or specific conductance is a measure of a material's ability to conduct an electric current. CNTs with particular structural parameters such as the degree of twist, which relates to CNT chirality, can be highly conducting, thus exhibiting metallic properties. A recognized system of nomenclature (M. S. Dresselhaus, et al. Science of Fullerenes and Carbon Nanotubes, Academic Press, San Diego, Calif. pp. 756-760, (1996)) has been formalized and is recognized by those skilled in the art with respect to CNT chirality. Thus, for example, CNTs are distinguished from each other by a double index (n,m) where n and m are integers that describe the cut and wrapping of hexagonal graphite so that it makes a tube when it is wrapped onto the surface of a cylinder and the edges are sealed together. When the two indices are the same, m=n, the resultant tube is said to be of the "arm-chair" (or n,n) type, since when the tube is cut perpendicular to the CNT axis only the sides of the hexagons are exposed and their pattern around the periphery of the tube edge resembles the arm and seat of an arm chair repeated n times. Arm-chair CNTs, in particular SWNTs, are metallic, and have extremely high electrical and thermal conductivity. In addition, such SWNTs have-extremely high tensile strength.

In addition to the degree of twist CNT diameter also effects electrical conductivity. As described above, CNT diameter can be controlled by use of controlled size CNT-forming catalyst nanoparticles. CNTs can also be formed as semiconducting materials. Conductivity in multi-walled CNTs (MWNTs) can be more complex. Interwall reactions within MWNTs can redistribute current over individual tubes non-uniformly. By contrast, there is no change in current across different parts of metallic single-walled nanotubes (SWNTs). Carbon nanotubes also have very high thermal conductivity, comparable to diamond crystal and in-plane graphite sheet.

The present disclosure is directed, in part, to carbon nanotube-infused ("CNT-infused") fiber materials incorporated into composite structures. The infusion of CNTs to the fiber material can serve many functions including, for example, as a sizing agent to protect against damage from moisture, oxidation, abrasion, and compression. A CNT-based sizing can also serve as an interface between the fiber material and a matrix material in a composite. The CNTs can also serve as one of several sizing agents coating the fiber material.

Moreover, CNTs infused on a fiber material can alter various properties of the fiber material, such as thermal and/or electrical conductivity, and/or tensile strength, for example. The processes employed to make CNT-infused fiber materials provide CNTs with substantially uniform length and distribution to impart their useful properties uniformly over the fiber material that is being modified. Furthermore, the processes disclosed herein are suitable for the generation of CNT-infused fiber materials of spoolable dimensions.

The present disclosure is also directed, in part, to processes for making CNT-infused fiber materials. The processes disclosed herein can be applied to nascent fiber materials generated de novo before, or in lieu of, application of a typical sizing solution to the fiber material. Alternatively, the processes disclosed herein can utilize a commercial fiber material, for example, a carbon or glass tow that already has a sizing applied to its surface. In such embodiments, the sizing can be removed to provide a direct interface between the carbon or glass fiber material and the synthesized CNTs, although a barrier coating and/or transition metal particle can serve as an intermediate layer providing indirect infusion, as explained further below. After CNT synthesis further sizing agents can be applied to the fiber material as desired.

The processes described herein allow for the continuous production of carbon nanotubes of uniform length and distribution along spoolable lengths of tow, tapes, fabrics and other 3D woven structures. While various mats, woven and non-woven fabrics and the like can be functionalized by processes of the invention, it is also possible to generate such higher ordered structures from the parent tow, yarn or the like after CNT functionalization of these parent materials. For example, a CNT-infused woven glass fabric can be generated from a CNT-infused glass fiber tow.

In some embodiments, the present invention provides a composition that includes a carbon nanotube (CNT)-infused fiber material. The CNT-infused fiber material includes a fiber material of spoolable dimensions, an optional barrier coating conformally disposed about the fiber material, and carbon nanotubes (CNTs) infused to the fiber material. The infusion of CNTs to the fiber material can include a bonding motif of direct bonding of individual CNTs to the fiber material or indirect bonding via a transition metal NP, the optional barrier coating, or both. In some embodiments, a barrier coating is not necessary. The type of fiber employed can dictate whether a barrier coating is employed. For example, carbon, metal, and organic fibers employ a barrier coating, as described further below, to avoid catalyst-catalyst and/or catalyst-substrate interactions. Other fiber types can also benefit from the presence of a barrier coating, although the use is optional.

Without being bound by theory, transition metal NPs, which serve as a CNT-forming catalyst, can catalyze CNT growth by forming a CNT growth seed structure. In one embodiment, the CNT-forming catalyst can remain at the base of the fiber material, locked by a barrier coating (when in use), and infused to the surface of the fiber material. In such a case, the seed structure initially formed by the transition metal nanoparticle catalyst is sufficient for continued non-catalyzed seeded CNT growth without allowing the catalyst to move along the leading edge of CNT growth, as often observed in the art. In such a case, the NP serves as a point of attachment for the CNT to the fiber material. The presence of a barrier coating can also lead to further indirect bonding motifs. For example, the CNT forming catalyst can be locked into the barrier coating, but not in surface contact with fiber material. In such a case a stacked structure with the barrier coating disposed between the CNT forming catalyst and fiber material can result. In either case, the CNTs formed are infused to the fiber material. In some embodiments, some barrier coatings will still allow the CNT growth catalyst to follow the leading edge of the growing nanotube. In such cases, this can result in direct bonding of the CNTs to the fiber material or, optionally, to the barrier coating. Regardless of the exact nature of the actual bonding motif formed between the carbon nanotubes and the fiber material, the infused CNT is robust and allows the CNT-infused fiber material to exhibit carbon nanotube properties and/or characteristics.

Again, without being bound by theory, when growing CNTs on fiber materials, the elevated temperatures and/or any residual oxygen and/or moisture that can be present in the reaction chamber can damage certain fiber materials. Moreover, the fiber material itself can be damaged by reaction with the CNT-forming catalyst itself. For example, carbon-based fiber material can behave as a carbon feedstock to the catalyst at the reaction temperatures employed for CNT synthesis. Such excess carbon can disturb the controlled introduction of the carbon feedstock gas and can even serve to poison the catalyst by overloading it with carbon. The barrier coating employed in the invention is designed to facilitate CNT synthesis on such carbon-rich fiber materials. Without being bound by theory, the coating can provide a thermal barrier to heat degradation and/or can be a physical barrier preventing exposure of the fiber material to the environment at the elevated temperatures. Alternatively or additionally, it can minimize the surface area contact between the CNT-forming catalyst and the fiber material and/or it can mitigate the exposure of the fiber material to the CNT-forming catalyst at CNT growth temperatures.

Compositions having CNT-infused fiber materials are provided in which the CNTs are substantially uniform in length. In the continuous process described herein, the residence time of the fiber material in a CNT growth chamber can be modulated to control CNT growth and ultimately, CNT length. This provides a means to control specific properties of the CNTs grown. CNT length can also be controlled through modulation of the carbon feedstock and carrier gas flow rates and reaction temperature. Additional control of the CNT properties can be obtained by controlling, for example, the size of the catalyst used to prepare the CNTs. For example, 1 nm transition metal nanoparticle catalysts can be used to provide SWNTs in particular. Larger catalysts can be used to prepare predominantly MWNTs.

Additionally, the CNT growth processes employed are useful for providing a CNT-infused fiber material with uniformly distributed CNTs on fiber materials while avoiding bundling and/or aggregation of the CNTs that can occur in processes in which pre-formed CNTs are suspended or dispersed in a solvent solution and applied by hand to the fiber material. Such aggregated CNTs tend to adhere weakly to a fiber material and the characteristic CNT properties are weakly expressed, if at all. In some embodiments, the maximum distribution density, expressed as percent coverage, that is, the surface area of fiber covered, can be as high as about 55% assuming about 8 nm diameter CNTs with 5 walls. This coverage is calculated by considering the space inside the CNTs as being "fillable" space. Various distribution/density values can be achieved by varying catalyst dispersion on the surface as well as controlling gas composition and process speed. Typically for a given set of parameters, a percent coverage within about 10% can be achieved across a fiber surface. Higher density and shorter CNTs are useful for improving mechanical properties, while longer CNTs with lower density are useful for improving thermal and electrical properties, although increased density is still favorable. A lower density can result when longer CNTs are grown. This can be the result of the higher temperatures and more rapid growth causing lower catalyst particle yields.

The compositions of the invention having CNT-infused fiber materials can include a fiber material such as a filament, a fiber yarn, a fiber tow, a tape, a fiber-braid, a woven fabric, a non-woven fiber mat, a fiber ply, and other 3D woven structures. Filaments include high aspect ratio fibers having diameters ranging in size from between about 1 micron to about 100 microns. Fiber tows are generally compactly associated bundles of filaments and are usually twisted together to give yarns.

Yarns include closely associated bundles of twisted filaments. Each filament diameter in a yarn is relatively uniform. Yarns have varying weights described by their 'tex,' expressed as weight in grams of 1000 linear meters, or denier, expressed as weight in pounds of 10,000 yards, with a typical tex range usually being between about 200 tex to about 2000 tex.

Tows include loosely associated bundles of untwisted filaments. As in yarns, filament diameter in a tow is generally uniform. Tows also have varying weights and the tex range is usually between 200 tex and 2000 tex. They are frequently characterized by the number of thousands of filaments in the tow, for example 12K tow, 24K tow, 48K tow, and the like.

Tapes are materials that can be assembled as weaves or can represent non-woven flattened tows. Tapes can vary in width and are generally two-sided structures similar to ribbon. Processes of the present invention are compatible with CNT infusion on one or both sides of a tape. CNT-infused tapes can resemble a "carpet" or "forest" on a flat substrate surface. Again, processes of the invention can be performed in a continuous mode to functionalize spools of tape.

Fiber-braids represent rope-like structures of densely packed fibers. Such structures can be assembled from yarns, for example. Braided structures can include a hollow portion or a braided structure can be assembled about another core material.

In some embodiments a number of primary fiber material structures can be organized into fabric or sheet-like structures. These include, for example, woven fabrics, non-woven fiber mat and fiber ply, in addition to the tapes described above. Such higher ordered structures can be assembled from parent tows, yarns, filaments or the like, with CNTs already infused in the parent fiber. Alternatively such structures can serve as the substrate for the CNT infusion processes described herein.

There are three types of carbon fiber which are categorized based on the precursors used to generate the fibers, any of which can be used in the invention: Rayon, Polyacrylonitrile (PAN) and Pitch. Carbon fiber from rayon precursors, which are cellulosic materials, has relatively low carbon content at about 20% and the fibers tend to have low strength and stiffness. Polyacrylonitrile (PAN) precursors provide a carbon fiber with a carbon content of about 55%. Carbon fiber based on a PAN precursor generally has a higher tensile strength than carbon fiber based on other carbon fiber precursors due to a minimum of surface defects.

Pitch precursors based on petroleum asphalt, coal tar, and polyvinyl chloride can also be used to produce carbon fiber. Although pitches are relatively low in cost and high in carbon yield, there can be issues of non-uniformity in a given batch.

Glass-types used in the glass fiber materials can be any type, including for example, E-glass, A-glass, E-CR-glass, C-glass, D-glass, R-glass, and S-glass. E-glass includes alumino-borosilicate glass with less than 1% by weight alkali oxides and is mainly used for glass-reinforced plastics. A-glass includes alkali-lime glass with little or no boron oxide. E-CR-glass includes alumino-lime silicate with less than 1% by weight alkali oxides and has high acid resistance. C-glass includes alkali-lime glass with high boron oxide content and is used, for example, for glass staple fibers. D-glass includes borosilicate glass and possesses a high dielectric constant. R-glass includes alumino silicate glass without MgO and CaO and possesses high mechanical strength. S-glass includes alumino silicate glass without CaO but with high MgO content and possesses high tensile strength. One or more of these glass types can be processed into the glass fiber materials described above. In particular embodiments, the glass is E-glass. In other embodiments, the glass is S-glass.

Ceramic-types used in ceramic fiber materials can be any type, including for example, oxides such as alumina and zirconia, carbides, such as boron carbide, silicon carbide, and tungsten carbide, and nitrides, such as boron nitride and silicon nitride. Other ceramic fiber materials include, for example, borides and silicides. Ceramic fiber materials may occur as composite materials with other fiber types. It is common to find fabric-like ceramic fiber materials that also incorporate glass fiber, for example.

Metals fiber materials can include any metal in zero-valent oxidation state including, for example, d-block metals, lanthanides, actinides, main group metals and the like. Any of these metals can also be used in non-zero-valent oxidation state, including, for example, metal oxides, metal nitrides, and the like. Exemplary d-block metals include, for example, scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, and gold. Exemplary main group metals include, for example, aluminum, gallium, indium, tin, thallium, lead, and bismuth. Exemplary metal salts useful in the invention include, for example.

Aramid fiber materials are aromatic polyamide structures belonging to the nylon family and exemplified by the well-known KEVLAR® product produced by DuPont. Aramid fiber materials can include the para-aramids, which include commercial products such as KEVLAR®, TECHNORA®, and TWARON®. Other aramid fibers useful in the invention include the meta-aramids such as commercially available NOMEX®, TEIJINCONEX®, KERMEL®, X-FIPER®, and CONEX/NEW STAR®. Another aramid useful aramid is SULFRON®. Aramids useful in the invention can also be formulated as mixture as well, for example, blends of NOMEX® and KEVLAR® are used to make fireproof clothing.

CNTs lend their characteristic properties such as mechanical strength, low to moderate electrical resistivity, high thermal conductivity, and the like to the CNT-infused fiber material. For example, in some embodiments, the electrical resistivity of a carbon nanotube-infused carbon fiber material is lower than the electrical resistivity of a parent carbon fiber material. More generally, the extent to which the resulting CNT-infused fiber expresses these characteristics can be a function of the extent and density of coverage of the fiber by the carbon nanotubes. Any amount of the fiber surface area, from 0-55% of the fiber can be covered assuming an 8 nm diameter, 5-walled MWNT (again this calculation counts the space inside the CNTs as fillable). This number is lower for smaller diameter CNTs and more for greater diameter CNTs. 55% surface area coverage is equivalent to about 15,000 CNTs/micron$^2$. Further CNT properties can be imparted to the fiber material in a manner dependent on CNT length, as described above. Infused CNTs can vary in length ranging from between about 1 micron to about 500 microns, including 1 micron, 2 microns, 3 microns, 4 micron, 5, microns, 6, microns, 7 microns, 8 microns, 9 microns, 10 microns, 15 microns, 20 microns, 25 microns, 30 microns, 35 microns, 40 microns, 45 microns, 50 microns, 60 microns, 70 microns, 80 microns, 90 microns, 100 microns, 150 microns, 200 microns, 250 microns, 300 microns, 350 microns, 400 microns, 450 microns, 500 microns, and all values in between. CNTs can also be less than about 1 micron in length, including about 0.5 microns, for example. CNTs can also be greater than 500 microns, including for example, 510 microns, 520 microns, 550 microns, 600 microns, 700 microns and all values in between.

Compositions of the invention can incorporate CNTs have a length from about 1 micron to about 10 microns. Such CNT lengths can be useful in application to increase shear strength. CNTs can also have a length from about 5 to about 70 microns. Such CNT lengths can be useful in applications for increased tensile strength if the CNTs are aligned in the fiber direction. CNTs can also have a length from about 10 microns to about 100 microns. Such CNT lengths can be useful to increase electrical/thermal properties as well as mechanical properties. The process used in the invention can also provide CNTs having a length from about 100 microns to about 500 microns, which can also be beneficial to increase electrical and thermal properties. Such control of CNT length is readily achieved through modulation of carbon feedstock and inert gas flow rates coupled with varying linespeeds and growth temperature.

In some embodiments, compositions that include spoolable lengths of CNT-infused fiber materials can have various uniform regions with different lengths of CNTs. For example, it can be desirable to have a first portion of CNT-infused carbon fiber material with uniformly shorter CNT lengths to enhance shear strength properties, and a second portion of the same spoolable material with a uniform longer CNT length to enhance electrical or thermal properties.

Processes of the invention for CNT infusion to fiber materials allow control of the CNT lengths with uniformity and in a continuous process allowing spoolable carbon fiber materials to be functionalized with CNTs at high rates. With material residence times between 5 to 300 seconds, linespeeds in a continuous process for a system that is 3 feet long can be in a range anywhere from about 0.5 ft/min to about 36 ft/min and greater. The speed selected depends on various parameters as explained further below.

In some embodiments, a material residence time of about 5 to about 30 seconds can produce CNTs having a length between about 1 micron to about 10 microns. In some embodiments, a material residence time of about 30 to about 180 seconds can produce CNTs having a length between about 10 microns to about 100 microns. In still further embodiments, a material residence time of about 180 to about 300 seconds can produce CNTs having a length between about 100 microns to about 500 microns. One skilled in the art will recognize that these ranges are approximate and that CNT length can also be modulated by reaction temperatures, and carrier and carbon feedstock concentrations and flow rates.

CNT-infused fiber materials of the invention optionally include a barrier coating. Barrier coatings can include for example an alkoxysilane, methylsiloxane, an alumoxane, alumina nanoparticles, spin on glass and glass nanoparticles. As described below, the CNT-forming catalyst can be added to the uncured barrier coating material and then applied to the fiber material together. In other embodiments the barrier coating material can be added to the fiber material prior to deposition of the CNT-forming catalyst. The barrier coating material can be of a thickness sufficiently thin to allow exposure of the CNT-forming catalyst to the carbon feedstock for subsequent CVD growth. In some embodiments, the thickness is less than or about equal to the effective diameter of the CNT-forming catalyst. In some embodiments, the thickness of the barrier coating is in a range from between about 10 nm to about 100 nm. The barrier coating can also be less than 10 nm, including 1 nm, 2 nm, 3 nm, 4 nm, 5 nm, 6 nm, 7 nm, 8 nm, 9 nm, 10 nm, and any value in between.

Without being bound by theory, the barrier coating can serve as an intermediate layer between the fiber material and the CNTs and serves to mechanically infuse the CNTs to the fiber material. Such mechanical infusion still provides a robust system in which the fiber material serves as a platform for organizing the CNTs while still imparting properties of the CNTs to the fiber material. Moreover, the benefit of including a barrier coating is the immediate protection it provides the fiber material from chemical damage due to exposure to moisture and/or any thermal damage due to heating of the fiber material at the temperatures used to promote CNT growth.

The infused CNTs disclosed herein can effectively function as a replacement for conventional fiber "sizing." The infused CNTs are more robust than conventional sizing materials and can improve the fiber-to-matrix interface in composite materials and, more generally, improve fiber-to-fiber interfaces. Indeed, the CNT-infused fiber materials disclosed herein are themselves composite materials in the sense the CNT-infused fiber material properties will be a combination of those of the fiber material as well as those of the infused CNTs. Consequently, embodiments of the present invention provide a means to impart desired properties to a fiber material that otherwise lack such properties or possesses them in insufficient measure. Fiber materials can be tailored or engineered to meet the requirements of specific applications. The CNTs acting as sizing can protect fiber materials from absorbing moisture due to the hydrophobic CNT structure. Moreover, hydrophobic matrix materials, as further exemplified below, interact well with hydrophobic CNTs to provide improved fiber to matrix interactions.

Despite the beneficial properties imparted to a fiber material having infused CNTs described above, the compositions of the present invention can include further "conventional" sizing agents. Such sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such secondary sizing agents can be used to protect the CNTs themselves or provide further properties to the fiber not imparted by the presence of the infused CNTs.

Compositions of the present invention can further include a matrix material to form a composite with the CNT-infused fiber material. Such matrix materials can include, for example, an epoxy, a polyester, a vinylester, a polyetherimide, a polyetherketoneketone, a polyphthalamide, a polyetherketone, a polytheretherketone, a polyimide, a phenol-formaldehyde, and a bismaleimide. Matrix materials useful in the present invention can include any of the known matrix materials (see Mel M. Schwartz, Composite Materials Handbook (2d ed. 1992)). Matrix materials more generally can include resins (polymers), both thermosetting and thermoplastic, metals, ceramics, and cements.

Thermosetting resins useful as matrix materials include phthalic/maelic type polyesters, vinyl esters, epoxies, phenolics, cyanates, bismaleimides, and nadic end-capped polyimides (e.g., PMR-15). Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester.

Metals useful as matrix materials include alloys of aluminum such as aluminum 6061, 2024, and 713 aluminum braze. Ceramics useful as matrix materials include carbon ceramics, such as lithium aluminosilicate, oxides such as alumina and mullite, nitrides such as silicon nitride, and carbides such as silicon carbide. Cements useful as matrix materials include carbide-base cermets (tungsten carbide, chromium carbide, and titanium carbide), refractory cements (tungsten-thoria and barium-carbonate-nickel), chromium-alumina, nickel-magnesia iron-zirconium carbide. Any of the above-described matrix materials can be used alone or in combination.

Figure 1:
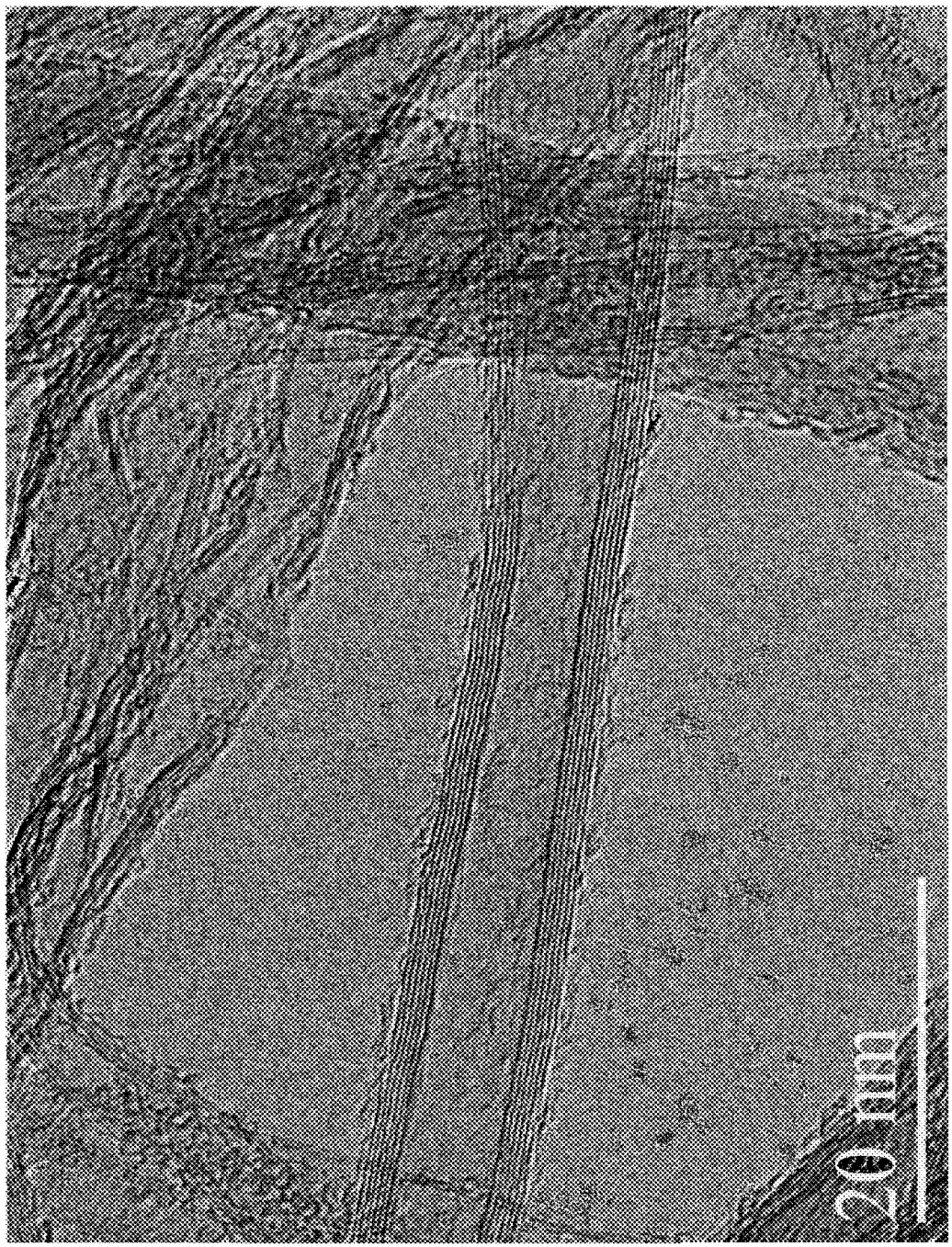
FIG. 1 shows a transmission electron microscope (TEM) image of a multi-walled CNT (MWNT) grown on AS4 carbon fiber via a continuous CVD process.
Figure 2:
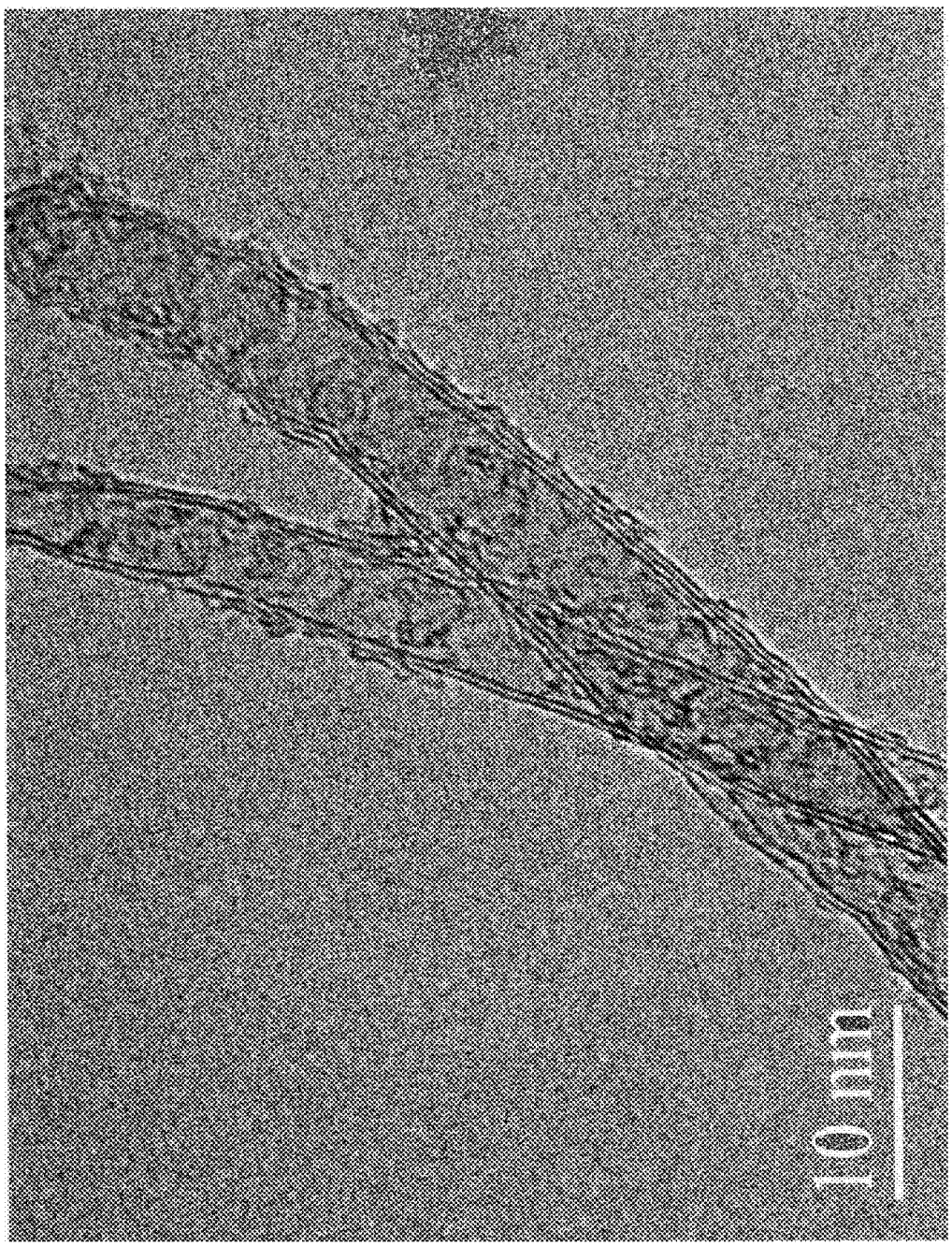
FIG. 2 shows a TEM image of a double-walled CNT (DWNT) grown on AS4 carbon fiber via a continuous CVD process.
Figure 3:
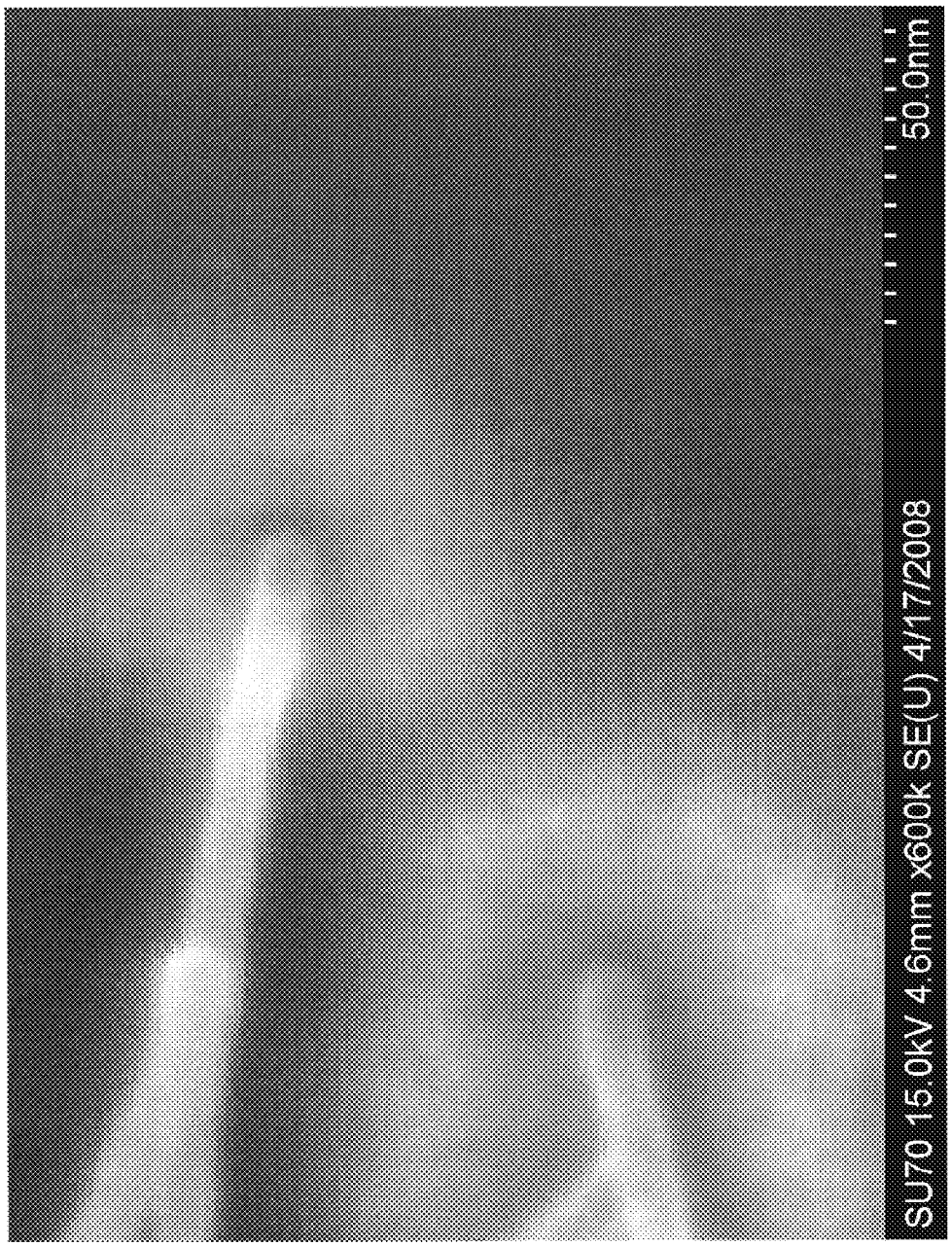
FIG. 3 shows a scanning electron microscope (SEM) image of CNTs growing from within the barrier coating where the CNT-forming nanoparticle catalyst was mechanically infused to the carbon fiber material surface.
Figure 4:
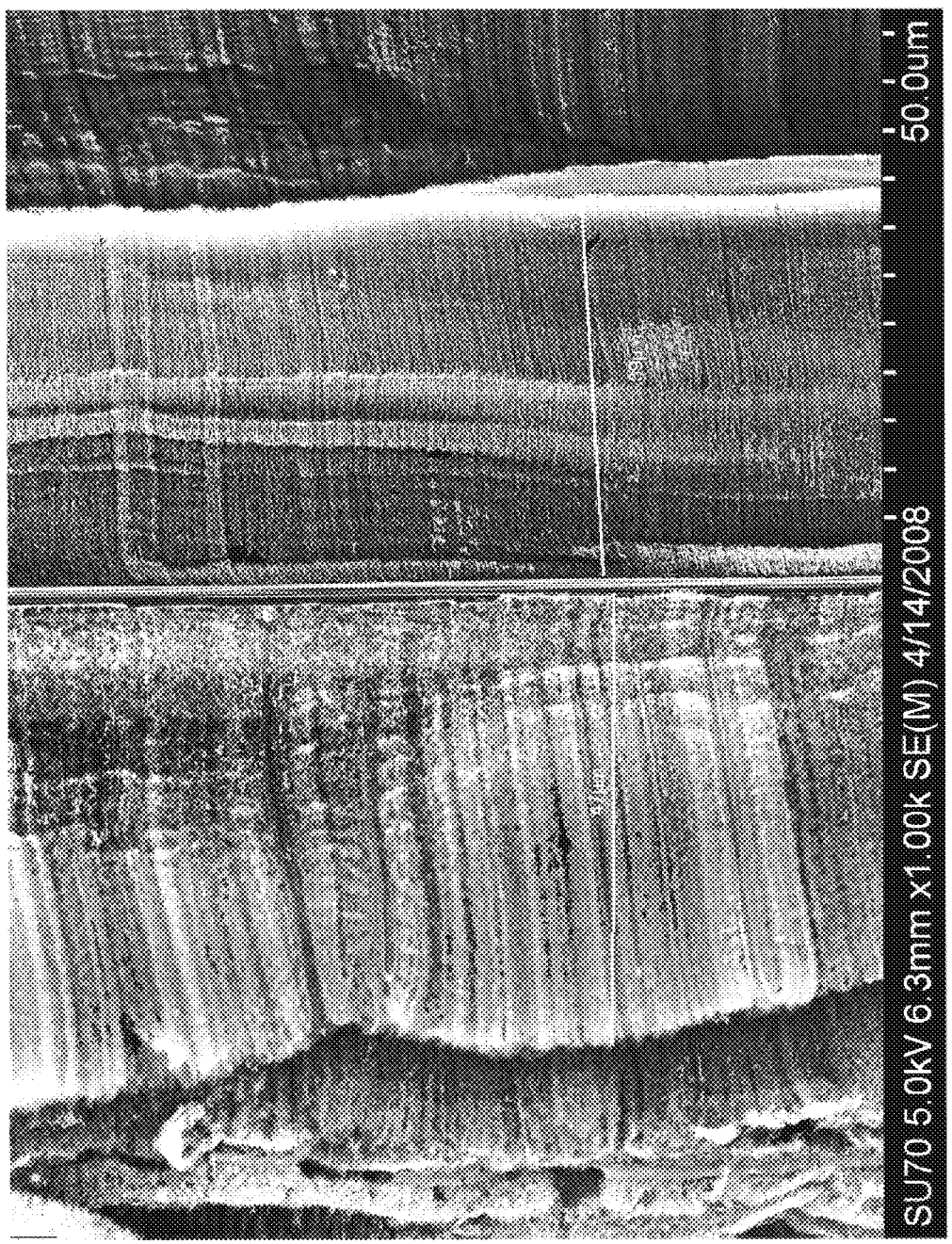
FIG. 4 shows a SEM image demonstrating the consistency in length distribution of CNTs grown on a carbon fiber material to within 20% of a targeted length of about 40 microns.
Figure 5:
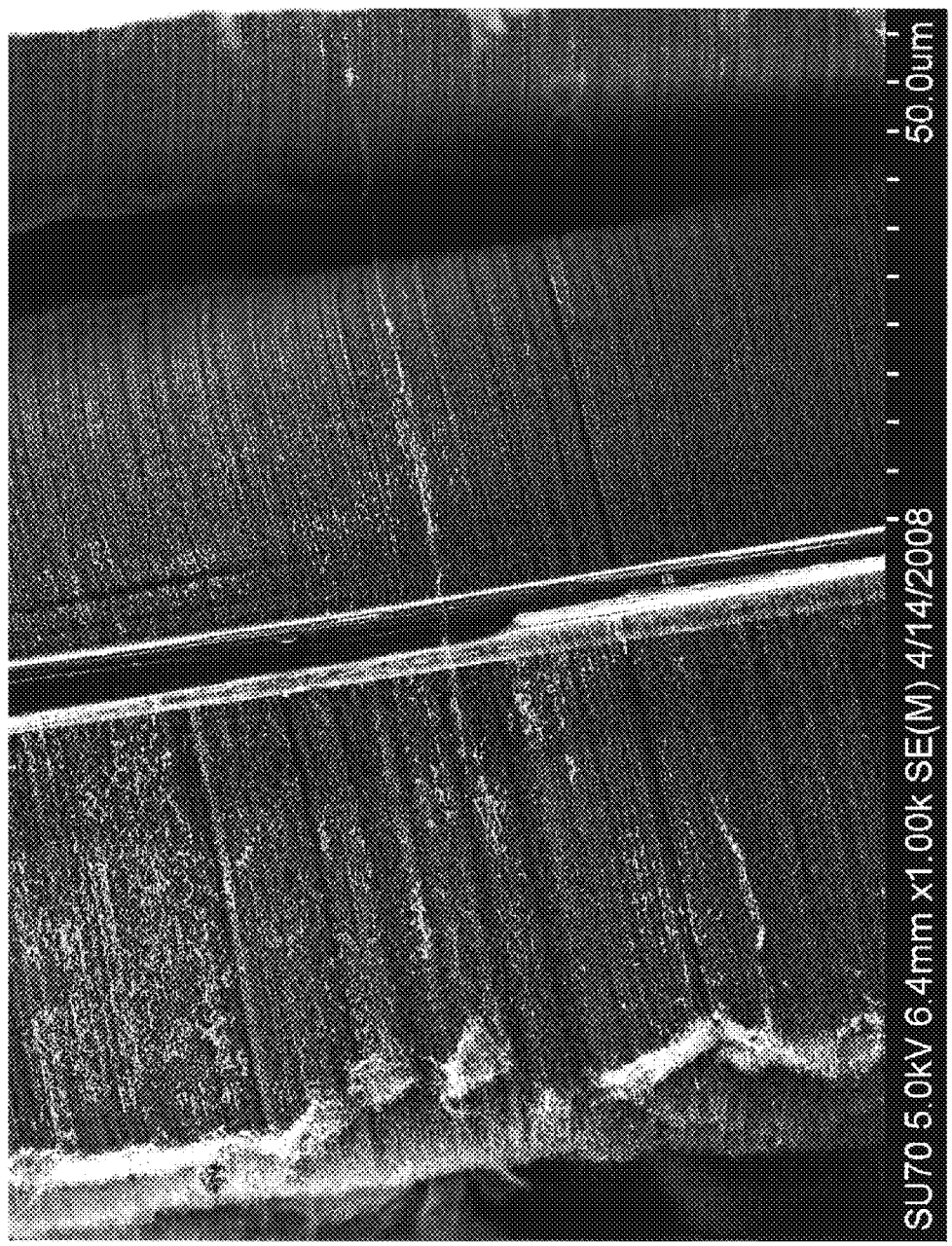
FIG. 5 shows an SEM image demonstrating the effect of a barrier coating on CNT growth. Dense, well aligned CNTs grew where barrier coating was applied and no CNTs grew where barrier coating was absent.
Figure 6:
FIG. 6 shows a low magnification SEM of CNTs on carbon fiber demonstrating the uniformity of CNT density across the fibers within about 10%.

FIGS. 1-6 shows TEM and SEM images of carbon fiber materials prepared by the processes described herein. The procedures for preparing these materials are further detailed below and in Examples I-III. FIGS. 1 and 2 show TEM images of multi-walled and double-walled carbon nanotubes, respectively, that were prepared on an AS4 carbon fiber in a continuous process. FIG. 3 shows a scanning electron microscope (SEM) image of CNTs growing from within the barrier coating after the CNT-forming nanoparticle catalyst was mechanically infused to a carbon fiber material surface. FIG. 4 shows a SEM image demonstrating the consistency in length distribution of CNTs grown on a carbon fiber material to within 20% of a targeted length of about 40 microns. FIG. 5 shows an SEM image demonstrating the effect of a barrier coating on CNT growth. Dense, well aligned CNTs grew where barrier coating was applied and no CNTs grew where barrier coating was absent. FIG. 6 shows a low magnification SEM of CNTs on carbon fiber demonstrating the uniformity of CNT density across the fibers within about 10%.

CNT-infused fiber materials can enhance structural elements in aerospace and ballistics applications. For example, the structures such as nose cones in missiles, leading edge of wings, primary structural parts, such as flaps and aerofoils, propellers and air brakes, small plane fuselages, helicopter shells and rotor blades, aircraft secondary structural parts, such as floors, doors, seats, air conditioners, and secondary tanks and airplane motor parts can benefit from the structural enhancement provided by CNT-infused fibers. Structural enhancement in many other applications can include, for example, mine sweeper hulls, helmets, radomes, rocket nozzles, rescue stretchers, and engine components. In building and construction, structural enhancement of exterior features include columns, pediments, domes, cornices, and formwork. Likewise, in interior building structures such as blinds, sanitary-ware, window profiles, and the like can all benefit from the use of CNT-infused carbon fiber materials.

In maritime industry, structural enhancement can include boat hulls, stringers, and decks. CNT-infused fiber materials can also be used in the heavy transportation industry in large panels for trailer walls, floor panels for railcars, truck cabs, exterior body molding, bus body shells, and cargo containers, for example. In automotive applications, CNT-infused carbon fiber materials can be used in interior parts, such as trimming, seats, and instrument panels. Exterior structures such as body panels, openings, underbody, and front and rear modules can all benefit from the use of CNT-infused fiber materials. Even automotive engine compartment and fuel mechanical area parts, such as axles and suspensions, fuel and exhaust systems, and electrical and electronic components can all utilize CNT-infused fiber materials.

Other applications of CNT-infused fiber materials include, bridge construction, reinforced concrete products, such as dowel bars, reinforcing bars, post-tensioning and pre-stressing tendons, stay-in-place framework, electric power transmission and distribution structures such as utility poles, transmission poles, and cross-arms, highway safety and roadside features such as sign supports, guardrails, posts and supports, noise barriers, and in municipal pipes and storage tanks.

CNT-infused fiber materials can also be used in a variety of leisure equipment such as water and snow skis, kayaks, canoes and paddles, snowboards, golf club shafts, golf trolleys, fishing rods, and swimming pools. Other consumer goods and business equipment include gears, pans, housings, gas pressure bottles, components for household appliances, such as washers, washing machine drums, dryers, waste disposal units, air conditioners and humidifiers.

The electrical properties of CNT-infused fibers also can impact various energy and electrical applications. For example, CNT-infused fiber materials can be used in wind turbine blades, solar structures, electronic enclosures, such as laptops, cell phones, computer cabinets, where such CNT-infused materials can be used in EMI shielding, for example. Other applications include powerlines, cooling devices, light poles, circuit boards, electrical junction boxes, ladder rails, optical fiber, power built into structures such as data lines, computer terminal housings, and business equipment, such as copiers, cash registers and mailing equipment.

In some embodiments the present invention provides a continuous process for CNT infusion that includes (a) disposing a carbon nanotube-forming catalyst on a surface of a fiber material of spoolable dimensions; and (b) synthesizing carbon nanotubes directly on the carbon fiber material, thereby forming a carbon nanotube-infused carbon fiber material. For a 9 foot long system, the linespeed of the process can range from between about 1.5 ft/min to about 108 ft/min. The linespeeds achieved by the process described herein allow the formation of commercially relevant quantities of CNT-infused fiber materials with short production times. For example, at 36 ft/min linespeed, the quantities of CNT-infused fibers (over 5% infused CNTs on fiber by weight) can exceed over 100 pounds or more of material produced per day in a system that is designed to simultaneously process 5 separate tows (20 lb/tow). Systems can be made to produce more tows at once or at faster speeds by repeating growth zones. Moreover, some steps in the fabrication of CNTs, as known in the art, have prohibitively slow rates preventing a continuous mode of operation. For example, in a typical process known in the art, a CNT-forming catalyst reduction step can take 1-12 hours to perform. CNT growth itself can also be time consuming, for example requiring tens of minutes for CNT growth, precluding the rapid linespeeds realized in the present invention. The process described herein overcomes such rate limiting steps.

The CNT-infused fiber material-forming processes of the invention can avoid CNT entanglement that occurs when trying to apply suspensions of pre-formed carbon nanotubes to fiber materials. That is, because pre-formed CNTs are not fused to the fiber material, the CNTs tend to bundle and entangle. The result is a poorly uniform distribution of CNTs that weakly adhere to the fiber material. However, processes of the present invention can provide, if desired, a highly uniform entangled CNT mat on the surface of the fiber material by reducing the growth density. The CNTs grown at low density are infused in the fiber material first. In such embodiments, the fibers do not grow dense enough to induce vertical alignment, the result is entangled mats on the fiber material surfaces. By contrast, manual application of pre-formed CNTs does not insure uniform distribution and density of a CNT mat on the fiber material.

Figure 7:
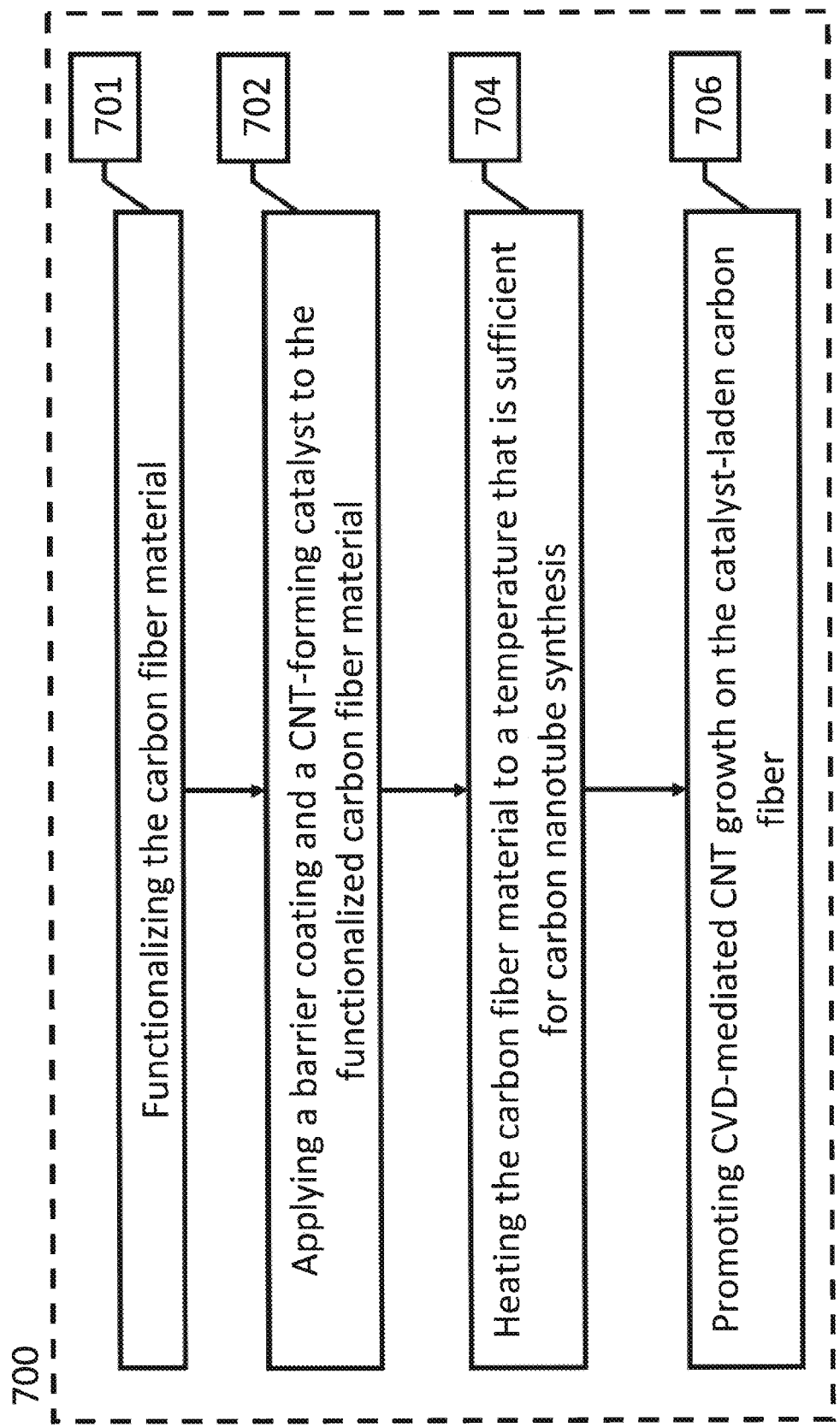
FIG. 7 shows a process for producing CNT-infused carbon fiber material in accordance with the illustrative embodiment of the present invention.

FIG. 7 depicts a flow diagram of process 700 for producing an exemplary CNT-infused carbon fiber material in accordance with an illustrative embodiment of the present invention. While this example employs carbon fiber materials, one skilled in the art will recognize that minor modifications can be employed to use any other fiber type such as glass, ceramic, metal, or organic fibers. Moreover, the various embodiments described below with respect fiber preparation, catalyst deposition, barrier coating, CNT growth conditions, and the like can all be readily altered to suit a particular fiber type.

Process 700 includes at least the operations of:

701: Functionalizing the carbon fiber material.

702: Applying a barrier coating and a CNT-forming catalyst to the functionalized carbon fiber material.

704: Heating the carbon fiber material to a temperature that is sufficient for carbon nanotube synthesis.

706: Promoting CVD-mediated CNT growth on the catalyst-laden carbon fiber.

In step 701, the carbon fiber material is functionalized to promote surface wetting of the fibers and to improve adhesion of the barrier coating.

To infuse carbon nanotubes into a carbon fiber material, the carbon nanotubes are synthesized on the carbon fiber material which is conformally coated with a barrier coating. In one embodiment, this is accomplished by first conformally coating the carbon fiber material with a barrier coating and then disposing nanotube-forming catalyst on the barrier coating, as per operation 702. In some embodiments, the barrier coating can be partially cured prior to catalyst deposition. This can provide a surface that is receptive to receiving the catalyst and allowing it to embed in the barrier coating, including allowing surface contact between the CNT forming catalyst and the carbon fiber material. In such embodiments, the barrier coating can be fully cured after embedding the catalyst. In some embodiments, the barrier coating is conformally coated over the carbon fiber material simultaneously with deposition of the CNT-form catalyst. Once the CNT-forming catalyst and barrier coating are in place, the barrier coating can be fully cured.

In some embodiments, the barrier coating can be fully cured prior to catalyst deposition. In such embodiments, a fully cured barrier-coated carbon fiber material can be treated with a plasma to prepare the surface to accept the catalyst. For example, a plasma treated carbon fiber material having a cured barrier coating can provide a roughened surface in which the CNT-forming catalyst can be deposited. The plasma process for "roughing" the surface of the barrier thus facilitates catalyst deposition. The roughness is typically on the scale of nanometers. In the plasma treatment process craters or depressions are formed that are nanometers deep and nanometers in diameter. Such surface modification can be achieved using a plasma of any one or more of a variety of different gases, including, without limitation, argon, helium, oxygen, nitrogen, and hydrogen. In some embodiments, plasma roughing can also be performed directly in the carbon fiber material itself. This can facilitate adhesion of the barrier coating to the carbon fiber material.

As described further below and in conjunction with FIG. 7, the catalyst is prepared as a liquid solution that contains CNT-forming catalyst that comprise transition metal nanoparticles. The diameters of the synthesized nanotubes are related to the size of the metal particles as described above. In some embodiments, commercial dispersions of CNT-forming transition metal nanoparticle catalyst are available and are used without dilution, in other embodiments commercial dispersions of catalyst can be diluted. Whether to dilute such solutions can depend on the desired density and length of CNT to be grown as described above.

With reference to the illustrative embodiment of FIG. 7, carbon nanotube synthesis is shown based on a chemical vapor deposition (CVD) process and occurs at elevated temperatures. The specific temperature is a function of catalyst choice, but will typically be in a range of about 500 to 1000° C. Accordingly, operation 704 involves heating the barrier-coated carbon fiber material to a temperature in the aforementioned range to support carbon nanotube synthesis.

In operation 706, CVD-promoted nanotube growth on the catalyst-laden carbon fiber material is then performed. The CVD process can be promoted by, for example, a carbon-containing feedstock gas such as acetylene, ethylene, and/or ethanol. The CNT synthesis processes generally use an inert gas (nitrogen, argon, helium) as a primary carrier gas. The carbon feedstock is provided in a range from between about 0% to about 15% of the total mixture. A substantially inert environment for CVD growth is prepared by removal of moisture and oxygen from the growth chamber.

In the CNT synthesis process, CNTs grow at the sites of a CNT-forming transition metal nanoparticle catalyst. The presence of the strong plasma-creating electric field can be optionally employed to affect nanotube growth. That is, the growth tends to follow the direction of the electric field. By properly adjusting the geometry of the plasma spray and electric field, vertically-aligned CNTs (i.e., perpendicular to the carbon fiber material) can be synthesized. Under certain conditions, even in the absence of a plasma, closely-spaced nanotubes will maintain a vertical growth direction resulting in a dense array of CNTs resembling a carpet or forest. The presence of the barrier coating can also influence the directionality of CNT growth.

The operation of disposing a catalyst on the fiber material can be accomplished by spraying or dip coating a solution or by gas phase deposition via, for example, a plasma process. The choice of techniques can be coordinated with the mode with which any optional barrier coating is applied. Thus, in some embodiments, after forming a solution of a catalyst in a solvent, catalyst can be applied by spraying or dip coating the barrier coated fiber material with the solution, or combinations of spraying and dip coating. Either technique, used alone or in combination, can be employed once, twice, thrice, four times, up to any number of times to provide a fiber material that is sufficiently uniformly coated with CNT-forming catalyst. When dip coating is employed, for example, a fiber material can be placed in a first dip bath for a first residence time in the first dip bath. When employing a second dip bath, the fiber material can be placed in the second dip bath for a second residence time. For example, carbon fiber materials can be subjected to a solution of CNT-forming catalyst for between about 3 seconds to about 90 seconds depending on the dip configuration and linespeed. Employing spraying or dip coating processes, a fiber material with a surface density of catalyst of less than about 5% surface coverage to as high as about 80% coverage, in which the CNT-forming catalyst nanoparticles are nearly monolayer. In some embodiments, the process of coating the CNT-forming catalyst on the fiber material should produce no more than a monolayer. For example, CNT growth on a stack of CNT-forming catalyst can erode the degree of infusion of the CNT to the fiber material. In other embodiments, the transition metal catalyst can be deposited on the fiber material using evaporation techniques, electrolytic deposition techniques, and other processes known to those skilled in the art, such as addition of the transition metal catalyst to a plasma feedstock gas as a metal organic, metal salt or other composition promoting gas phase transport.

Because processes of the invention are designed to be continuous, a spoolable fiber material can be dip-coated in a series of baths where dip coating baths are spatially separated. In a continuous process in which nascent fibers are being generated de novo, dip bath or spraying of CNT-forming catalyst can be the first step after applying and curing or partially curing a barrier coating to the fiber material. Application of a barrier coating and a CNT-forming catalyst can be performed in lieu of application of a sizing, for newly formed fiber materials. In other embodiments, the CNT-forming catalyst can be applied to newly formed fibers in the presence of other sizing agents after barrier coating. Such simultaneous application of CNT-forming catalyst and other sizing agents can still provide the CNT-forming catalyst in surface contact with the barrier coating of the fiber material to insure CNT infusion.

The catalyst solution employed can be a transition metal nanoparticle which can be any d-block transition metal as described above. In addition, the nanoparticles can include alloys and non-alloy mixtures of d-block metals in elemental form or in salt form, and mixtures thereof. Such salt forms include, without limitation, oxides, carbides, and nitrides. Non-limiting exemplary transition metal NPs include Ni, Fe, Co, Mo, Cu, Pt, Au, and Ag and salts thereof and mixtures thereof. In some embodiments, such CNT-forming catalysts are disposed on the fiber by applying or infusing a CNT-forming catalyst directly to the fiber material simultaneously with any barrier coating deposition. Many of these transition metal catalysts are readily commercially available from a variety of suppliers, including, for example, Ferrotec Corporation (Bedford, N.H.).

Catalyst solutions used for applying the CNT-forming catalyst to the fiber material can be in any common solvent that allows the CNT-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the CNT-forming catalyst nanoparticles. Concentrations of CNT-forming catalyst can be in a range from about 1:1 to 1:10000 catalyst to solvent. Such concentrations can be used when the barrier coating and CNT-forming catalyst is applied simultaneously as well.

In some embodiments heating of the fiber material can be at a temperature that is between about 500° C. and 1000° C. to synthesize carbon nanotubes after deposition of the CNT-forming catalyst. Heating at these temperatures can be performed prior to or substantially simultaneously with introduction of a carbon feedstock for CNT growth.

In some embodiments, the present invention provides a process that includes removing sizing agents from a fiber material, applying a barrier coating conformally over the fiber material, applying a CNT-forming catalyst to the fiber material, heating the fiber material to at least 500° C., and synthesizing carbon nanotubes on the fiber material. In some embodiments, operations of the CNT-infusion process include removing sizing from a fiber material, applying a barrier coating to the fiber material, applying a CNT-forming catalyst to the fiber material, heating the fiber material to CNT-synthesis temperature and CVD-promoted CNT growth the catalyst-laden fiber material. Thus, where commercial fiber materials are employed, processes for constructing CNT-infused fibers can include a discrete step of removing sizing from the fiber material before disposing any optional barrier coating and the catalyst on the fiber material.

The step of synthesizing carbon nanotubes can include numerous techniques for forming carbon nanotubes, including those disclosed in co-pending U.S. Patent Application No. US 2004/0245088 which is incorporated herein by reference. The CNTs grown on fibers of the present invention can be accomplished by techniques known in the art including, without limitation, micro-cavity, thermal or plasma-enhanced CVD techniques, laser ablation, arc discharge, and high pressure carbon monoxide (HiPCO). During CVD, in particular, a barrier coated fiber material with CNT-forming catalyst disposed thereon, can be used directly. In some embodiments, any conventional sizing agents can be removed prior CNT synthesis. In some embodiments, acetylene gas is ionized to create a jet of cold carbon plasma for CNT synthesis. The plasma is directed toward the catalyst-bearing fiber material. Thus, in some embodiments synthesizing CNTs on a fiber material includes (a) forming a carbon plasma; and (b) directing the carbon plasma onto the catalyst disposed on the fiber material. The diameters of the CNTs that are grown are dictated by the size of the CNT-forming catalyst as described above. In some embodiments, the sized fiber substrate is heated to between about 550 to about 800° C. to facilitate CNT synthesis. To initiate the growth of CNTs, two gases are bled into the reactor: a process gas such as argon, helium, or nitrogen, and a carbon-containing gas, such as acetylene, ethylene, ethanol or methane. CNTs grow at the sites of the CNT-forming catalyst.

In some embodiments, the CVD growth is plasma-enhanced. A plasma can be generated by providing an electric field during the growth process. CNTs grown under these conditions can follow the direction of the electric field. Thus, by adjusting the geometry of the reactor vertically aligned carbon nanotubes can be grown radially about a cylindrical fiber. In some embodiments, a plasma is not required for radial growth about the fiber. For fiber materials that have distinct sides such as tapes, mats, fabrics, plies, and the like, catalyst can be disposed on one or both sides and correspondingly, CNTs can be grown on one or both sides as well.

As described above, CNT-synthesis is performed at a rate sufficient to provide a continuous process for functionalizing spoolable fiber materials. Numerous apparatus configurations facilitate such continuous synthesis as exemplified below.

In some embodiments, CNT-infused fiber materials can be constructed in an "all plasma" process. An all plasma process can begin with roughing the fiber material with a plasma as described above to improve fiber surface wetting characteristics and provide a more conformal barrier coating (when in use), as well as improve coating adhesion via mechanical interlocking and chemical adhesion through the use of functionalization of the fiber material by using specific reactive gas species, such as oxygen, nitrogen, hydrogen in argon or helium based plasmas.

Barrier coated fiber materials pass through numerous further plasma-mediated steps to form the final CNT-infused product. In some embodiments, the all plasma process can include a second surface modification after the barrier coating is cured. This is a plasma process for "roughing" the surface of the barrier coating on the fiber material to facilitate catalyst deposition. As described above, surface modification can be achieved using a plasma of any one or more of a variety of different gases, including, without limitation, argon, helium, oxygen, ammonia, hydrogen, and nitrogen.

After surface modification, a barrier coated fiber material proceeds to catalyst application. This is a plasma process for depositing the CNT-forming catalyst on the fibers. The CNT-forming catalyst is typically a transition metal as described above. The transition metal catalyst can be added to a plasma feedstock gas as a precursor in the form of a ferrofluid, a metal organic, metal salt or other composition for promoting gas phase transport. The catalyst can be applied at room temperature in the ambient environment with neither vacuum nor an inert atmosphere being required. In some embodiments, the carbon fiber material is cooled prior to catalyst application.

Continuing the all-plasma process, carbon nanotube synthesis occurs in a CNT-growth reactor. This can be achieved through the use of plasma-enhanced chemical vapor deposition, wherein carbon plasma is sprayed onto the catalyst-laden fibers. Since carbon nanotube growth occurs at elevated temperatures (typically in a range of about 500 to 1000° C. depending on the catalyst), the catalyst-laden fibers can be heated prior to exposing to the carbon plasma. For the infusion process, a fiber material can be optionally heated until it softens. After heating, the fiber material is ready to receive the carbon plasma. The carbon plasma is generated, for example, by passing a carbon containing gas such as acetylene, ethylene, ethanol, and the like, through an electric field that is capable of ionizing the gas. This cold carbon plasma is directed, via spray nozzles, to the carbon fiber material. The fiber material can be in close proximity to the spray nozzles, such as within about 1 centimeter of the spray nozzles, to receive the plasma. In some embodiments, heaters are disposed above the carbon fiber material at the plasma sprayers to maintain the elevated temperature of the fiber material.

Another configuration for continuous carbon nanotube synthesis involves a special rectangular reactor for the synthesis and growth of carbon nanotubes directly on fiber materials. The reactor can be designed for use in a continuous in-line process for producing carbon-nanotube bearing fibers. In some embodiments, CNTs are grown via a chemical vapor deposition ("CVD") process at atmospheric pressure and at elevated temperature in the range of about 550° C. to about 800° C. in a multi-zone reactor. The fact that the synthesis occurs at atmospheric pressure is one factor that facilitates the incorporation of the reactor into a continuous processing line for CNT-on-fiber synthesis. Another advantage consistent with in-line continuous processing using such a zone reactor is that CNT growth occurs in a seconds, as opposed to minutes (or longer) as in other procedures and apparatus configurations typical in the art.

CNT synthesis reactors in accordance with the various embodiments include the following features:

Rectangular Configured Synthesis Reactors: The cross section of a typical CNT synthesis reactor known in the art is circular. There are a number of reasons for this including, for example, historical reasons (cylindrical reactors are often used in laboratories) and convenience (flow dynamics are easy to model in cylindrical reactors, heater systems readily accept circular tubes (quartz, etc.), and ease of manufacturing. Departing from the cylindrical convention, the present invention provides a CNT synthesis reactor having a rectangular cross section. The reasons for the departure are as follows: 1. Since many fiber materials that can be processed by the reactor are relatively planar such as flat tape or sheet-like in form, a circular cross section is an inefficient use of the reactor volume. This inefficiency results in several drawbacks for cylindrical CNT synthesis reactors including, for example, a) maintaining a sufficient system purge; increased reactor volume requires increased gas flow rates to maintain the same level of gas purge. This results in a system that is inefficient for high volume production of CNTs in an open environment; b) increased carbon feedstock gas flow; the relative increase in inert gas flow, as per a) above, requires increased carbon feedstock gas flows. Consider that the volume of a 12K carbon fiber tow is 2000 times less than the total volume of a synthesis reactor having a rectangular cross section. In an equivalent growth cylindrical reactor (i.e., a cylindrical reactor that has a width that accommodates the same planarized fiber material as the rectangular cross-section reactor), the volume of the fiber material is 17,500 times less than the volume of the chamber. Although gas deposition processes, such as CVD, are typically governed by pressure and temperature alone, volume has a significant impact on the efficiency of deposition. With a rectangular reactor there is a still excess volume. This excess volume facilitates unwanted reactions; yet a cylindrical reactor has about eight times that volume. Due to this greater opportunity for competing reactions to occur, the desired reactions effectively occur more slowly in a cylindrical reactor chamber. Such a slow down in CNT growth, is problematic for the development of a continuous process. One benefit of a rectangular reactor configuration is that the reactor volume can be decreased by using a small height for the rectangular chamber to make this volume ratio better and reactions more efficient. In some embodiments of the present invention, the total volume of a rectangular synthesis reactor is no more than about 3000 times greater than the total volume of a fiber material being passed through the synthesis reactor. In some further embodiments, the total volume of the rectangular synthesis reactor is no more than about 4000 times greater than the total volume of the fiber material being passed through the synthesis reactor. In some still further embodiments, the total volume of the rectangular synthesis reactor is less than about 10,000 times greater than the total volume of the fiber material being passed through the synthesis reactor. Additionally, it is notable that when using a cylindrical reactor, more carbon feedstock gas is required to provide the same flow percent as compared to reactors having a rectangular cross section. It should be appreciated that in some other embodiments, the synthesis reactor has a cross section that is described by polygonal forms that are not rectangular, but are relatively similar thereto and provide a similar reduction in reactor volume relative to a reactor having a circular cross section; c) problematic temperature distribution; when a relatively small-diameter reactor is used, the temperature gradient from the center of the chamber to the walls thereof is minimal. But with increased size, such as would be used for commercial-scale production, the temperature gradient increases. Such temperature gradients result in product quality variations across a fiber material substrate (i.e., product quality varies as a function of radial position). This problem is substantially avoided when using a reactor having a rectangular cross section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided. 2. Gas introduction: Because tubular furnaces are normally employed in the art, typical CNT synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall CNT growth rate because the incoming feedstock gas is continuously replenishing at the hottest portion of the system, which is where CNT growth is most active. This constant gas replenishment is an important aspect to the increased growth rate exhibited by the rectangular CNT reactors.

Zoning. Chambers that provide a relatively cool purge zone depend from both ends of the rectangular synthesis reactor. Applicants have determined that if hot gas were to mix with the external environment (i.e., outside of the reactor), there would be an increase in degradation of the fiber material. The cool purge zones provide a buffer between the internal system and external environments. Typical CNT synthesis reactor configurations known in the art typically require that the substrate is carefully (and slowly) cooled. The cool purge zone at the exit of the present rectangular CNT growth reactor achieves the cooling in a short period of time, as required for the continuous in-line processing.

Non-contact, hot-walled, metallic reactor. In some embodiments, a hot-walled reactor is made of metal is employed, in particular stainless steel. This can appear counterintuitive because metal, and stainless steel in particular, is more susceptible to carbon deposition (i.e., soot and by-product formation). Thus, most CNT reactor configurations use quartz reactors because there is less carbon deposited, quartz is easier to clean, and quartz facilitates sample observation. However, Applicants have observed that the increased soot and carbon deposition on stainless steel results in more consistent, faster, more efficient, and more stable CNT growth. Without being bound by theory it has been indicated that, in conjunction with atmospheric operation, the CVD process occurring in the reactor is diffusion limited. That is, the catalyst is "overfed;" too much carbon is available in the reactor system due to its relatively higher partial pressure (than if the reactor was operating under partial vacuum). As a consequence, in an open system—especially a clean one—too much carbon can adhere to catalyst particles, compromising their ability to synthesize CNTs. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, react with the catalyst at a rate that does not poison the catalyst. Existing systems run "cleanly" which, if they were open for continuous processing, would produced a much lower yield of CNTs at reduced growth rates.

Although it is generally beneficial to perform CNT synthesis "dirty" as described above, certain portions of the apparatus, such as gas manifolds and inlets, can nonetheless negatively impact the CNT growth process when soot created blockages. In order to combat this problem, such areas of the CNT growth reaction chamber can be protected with soot inhibiting coatings such as silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and CNT Synthesis. In the CNT synthesis reactor disclosed herein, both catalyst reduction and CNT growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present invention due, at least in part, to the fact that carbon feedstock gas is introduced at the center of the reactor, not the end as would be typical in the art using cylindrical reactors. The reduction process occurs as the fibers enter the heated zone; by this point, the gas has had time to react with the walls and cool off prior to reacting with the catalyst and causing the oxidation reduction (via hydrogen radical interactions). It is this transition region where the reduction occurs. At the hottest isothermal zone in the system, the CNT growth occurs, with the greatest growth rate occurring proximal to the gas inlets near the center of the reactor.

In some embodiments, when loosely affiliated fiber materials, such as carbon tow are employed, the continuous process can include steps that spreads out the strands and/or filaments of the tow. Thus, as a tow is unspooled it can be spread using a vacuum-based fiber spreading system, for example. When employing sized carbon fibers, which can be relatively stiff, additional heating can be employed in order to "soften" the tow to facilitate fiber spreading. The spread fibers which comprise individual filaments can be spread apart sufficiently to expose an entire surface area of the filaments, thus allowing the tow to more efficiently react in subsequent process steps. Such spreading can approach between about 4 inches to about 6 inches across for a 3 k tow. The spread tow can pass through a surface treatment step that is composed of a plasma system as described above. After a barrier coating is applied and roughened, spread fibers then can pass through a CNT-forming catalyst dip bath. The result is fibers of the carbon tow that have catalyst particles distributed radially on their surface. The catalyzed-laden fibers of the tow then enter an appropriate CNT growth chamber, such as the rectangular chamber described above, where a flow through atmospheric pressure CVD or PE-CVD process is used to synthesize the CNTs at rates as high as several microns per second. The fibers of the tow, now with radially aligned CNTs, exit the CNT growth reactor.

In some embodiments, CNT-infused fiber materials can pass through yet another treatment process that, in some embodiments is a plasma process used to functionalize the CNTs. Additional functionalization of CNTs can be used to promote their adhesion to particular resins. Thus, in some embodiments, the present invention provides CNT-infused fiber materials having functionalized CNTs.

As part of the continuous processing of spoolable fiber materials, the a CNT-infused carbon fiber material can further pass through a sizing dip bath to apply any additional sizing agents which can be beneficial in a final product. Finally if wet winding is desired, the CNT-infused fiber materials can be passed through a resin bath and wound on a mandrel or spool. The resulting fiber material/resin combination locks the CNTs on the fiber material allowing for easier handling and composite fabrication. In some embodiments, CNT infusion is used to provide improved filament winding. Thus, CNTs formed on carbon fibers such as carbon tow, are passed through a resin bath to produce resin-impregnated, CNT-infused carbon tow. After resin impregnation, the carbon tow can be positioned on the surface of a rotating mandrel by a delivery head. The tow can then be wound onto the mandrel in a precise geometric pattern in known fashion.

The winding process described above provides pipes, tubes, or other forms as are characteristically produced via a male mold. But the forms made from the winding process disclosed herein differ from those produced via conventional filament winding processes. Specifically, in the process disclosed herein, the forms are made from composite materials that include CNT-infused tow. Such forms will therefore benefit from enhanced strength and the like, as provided by the CNT-infused tow.

In some embodiments, a continuous process for infusion of CNTs on spoolable fiber materials can achieve a linespeed between about 0.5 ft/min to about 36 ft/min. In this embodiment where the CNT growth chamber is 3 feet long and operating at a 750° C. growth temperature, the process can be run with a linespeed of about 6 ft/min to about 36 ft/min to produce, for example, CNTs having a length between about 1 micron to about 10 microns. The process can also be run with a linespeed of about 1 ft/min to about 6 ft/min to produce, for example, CNTs having a length between about 10 microns to about 100 microns. The process can be run with a linespeed of about 0.5 ft/min to about 1 ft/min to produce, for example, CNTs having a length between about 100 microns to about 200 microns. The CNT length is not tied only to linespeed and growth temperature, however, the flow rate of both the carbon feedstock and the inert carrier gases can also influence CNT length. For example, a flow rate consisting of less than 1% carbon feedstock in inert gas at high linespeeds (6 ft/min to 36 ft/min) will result in CNTs having a length between 1 micron to about 5 microns. A flow rate consisting of more than 1% carbon feedstock in inert gas at high linespeeds (6 ft/min to 36 ft/min) will result in CNTs having length between 5 microns to about 10 microns.

In some embodiments, more than one fiber material can be run simultaneously through the process. For example, multiple tapes tows, filaments, strand and the like can be run through the process in parallel. Thus, any number of pre-fabricated spools of fiber material can be run in parallel through the process and re-spooled at the end of the process. The number of spooled fiber materials that can be run in parallel can include one, two, three, four, five, six, up to any number that can be accommodated by the width of the CNT-growth reaction chamber. Moreover, when multiple fiber materials are run through the process, the number of collection spools can be less than the number of spools at the start of the process. In such embodiments, strands, tows, or the like can be sent through a further process of combining such fiber materials into higher ordered carbon fiber materials such as woven fabrics or the like. The continuous process can also incorporate a post processing chopper that facilitates the formation CNT-infused chopped fiber mats, for example.

In some embodiments, processes of the invention allow for synthesizing a first amount of a first type of carbon nanotube on the fiber material, in which the first type of carbon nanotube is selected to alter at least one first property of the fiber material. Subsequently, process of the invention allow for synthesizing a second amount of a second type of carbon nanotube on the fiber material, in which the second type of carbon nanotube is selected to alter at least one second property of the fiber material.

In some embodiments, the first amount and second amount of CNTs are different. This can be accompanied by a change in the CNT type or not. Thus, varying the density of CNTs can be used to alter the properties of the original fiber material, even if the CNT type remains unchanged. CNT type can include CNT length and the number of walls, for example. In some embodiments the first amount and the second amount are the same. If different properties are desirable in this case along the two different stretches of the spoolable material, then the CNT type can be changed, such as the CNT length. For example, longer CNTs can be useful in electrical/thermal applications, while shorter CNTs can be useful in mechanical strengthening applications.

In light of the aforementioned discussion regarding altering the properties of the fiber materials, the first type of carbon nanotube and the second type of carbon nanotube can be the same, in some embodiments, while the first type of carbon nanotube and the second type of carbon nanotube can be different, in other embodiments. Likewise, the first property and the second property can be the same, in some embodiments. For example, the EMI shielding property can be the property of interest addressed by the first amount and type of CNTs and the 2nd amount and type of CNTs, but the degree of change in this property can be different, as reflected by differing amounts, and/or types of CNTs employed. Finally, in some embodiments, the first property and the second property can be different. Again this may reflect a change in CNT type. For example the first property can be mechanical strength with shorter CNTs, while the second property can be electrical/thermal properties with longer CNTs. One skilled in the art will recognize the ability to tailor the properties of the fiber material through the use of different CNT densities, CNT lengths, and the number of walls in the CNTs, such as single-walled, double-walled, and multi-walled, for example.

In some embodiments, processes of the present invention provide synthesizing a first amount of carbon nanotubes on a fiber material, such that this first amount allows the carbon nanotube-infused fiber material to exhibit a second group of properties that differ from a first group of properties exhibited by the fiber material itself. That is, selecting an amount that can alter one or more properties of the fiber material, such as tensile strength. The first group of properties and second group of properties can include at least one of the same properties, thus representing enhancing an already existing property of the fiber material. In some embodiments, CNT infusion can impart a second group of properties to the carbon nanotube-infused fiber material that is not included among the first group of properties exhibited by the fiber material itself.

As described above, tensile strength can include three different measurements: 1) Yield strength which evaluates the stress at which material strain changes from elastic deformation to plastic deformation, causing the material to deform permanently; 2) Ultimate strength which evaluates the maximum stress a material can withstand when subjected to tension, compression or shearing; and 3) Breaking strength which evaluates the stress coordinate on a stress-strain curve at the point of rupture. Composite shear strength evaluates the stress at which a material fails when a load is applied perpendicular to the fiber direction. Compression strength evaluates the stress at which a material fails when a compressive load is applied.

Young's modulus is a measure of the stiffness of an isotropic elastic material. It is defined as the ratio of the uniaxial stress over the uniaxial strain in the range of stress in which Hooke's Law holds. This can be experimentally determined from the slope of a stress-strain curve created during tensile tests conducted on a sample of the material.

Electrical conductivity or specific conductance is a measure of a material's ability to conduct an electric current. CNTs with particular structural parameters such as the degree of twist, which relates to CNT chirality, can be highly conducting, thus exhibiting metallic properties. A recognized system of nomenclature (M. S. Dresselhaus, et al. Science of Fullerenes and Carbon Nanotubes, Academic Press, San Diego, Calif. pp. 756-760, (1996)) has been formalized and is recognized by those skilled in the art with respect to CNT chirality. Thus, for example, CNTs are distinguished from each other by a double index (n,m) where n and m are integers that describe the cut and wrapping of hexagonal graphite so that it makes a tube when it is wrapped onto the surface of a cylinder and the edges are sealed together. When the two indices are the same, m=n, the resultant tube is said to be of the "arm-chair" (or n,n) type, since when the tube is cut perpendicular to the CNT axis only the sides of the hexagons are exposed and their pattern around the periphery of the tube edge resembles the arm and seat of an arm chair repeated n times. Arm-chair CNTs, in particular SWNTs, are metallic, and have extremely high electrical and thermal conductivity. In addition, such SWNTs have-extremely high tensile strength.

In addition to the degree of twist CNT diameter also effects electrical conductivity. As described above, CNT diameter can be controlled by use of controlled size CNT-forming catalyst nanoparticles. CNTs can also be formed as semiconducting materials. Conductivity in multi-walled CNTs (MWNTs) can be more complex. Interwall reactions within MWNTs can redistribute current over individual tubes nonuniformly. By contrast, there is no change in current across different parts of metallic single-walled nanotubes (SWNTs). Carbon nanotubes also have very high thermal conductivity, comparable to diamond crystal and in-plane graphite sheet.

The CNT-infused fiber materials can benefit from the presence of CNTs not only in the properties described above, but can also provide lighter materials in the process. Thus, such lower density and higher strength materials translates to greater strength to weight ratio. It is understood that modifications which do not substantially affect the activity of the various embodiments of this invention are also included within the definition of the invention provided herein. Accordingly, the following examples are intended to illustrate but not limit the present invention.

EXAMPLE I

This example shows how a carbon fiber material can be infused with CNTs in a continuous process to target thermal and electrical conductivity improvements.

In this example, the maximum loading of CNTs on fibers is targeted. 34-700 12 k carbon fiber tow with a tex value of 800 (Grafil Inc., Sacramento, Calif.) is implemented as the carbon fiber substrate. The individual filaments in this carbon fiber tow have a diameter of approximately 7 µm.

Figure 8:
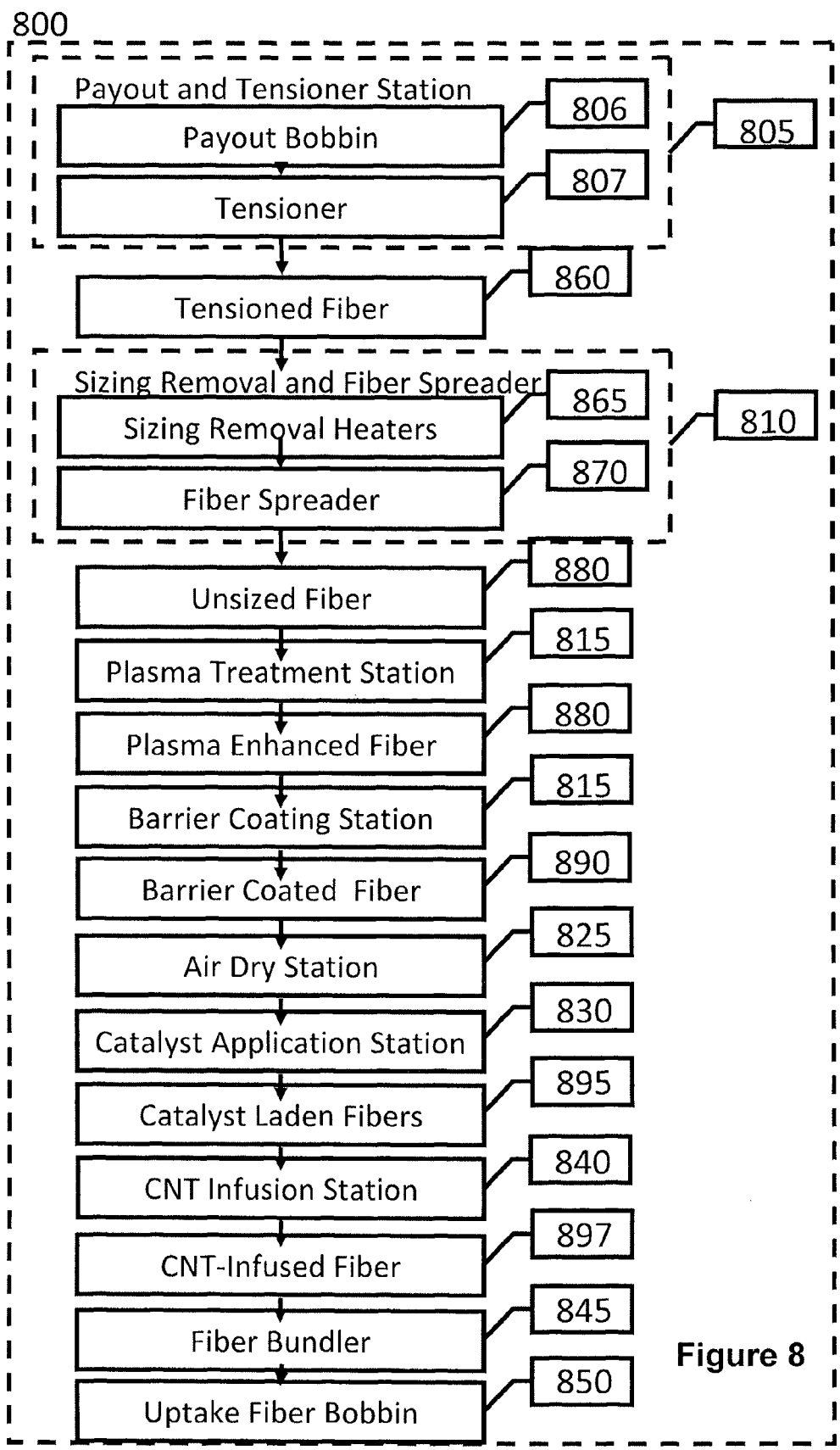
FIG. 8 shows how a carbon fiber material can be infused with CNTs in a continuous process to target thermal and electrical conductivity improvements.

FIG. 8 depicts system 800 for producing CNT-infused fiber in accordance with the illustrative embodiment of the present invention. System 800 includes a carbon fiber material payout and tensioner station 805, sizing removal and fiber spreader station 810, plasma treatment station 815, barrier coating application station 820, air dry station 825, catalyst application station 830, solvent flash-off station 835, CNT-infusion station 840, fiber bundler station 845, and carbon fiber material uptake bobbin 850, interrelated as shown.

Payout and tension station 805 includes payout bobbin 806 and tensioner 807. The payout bobbin delivers carbon fiber material 860 to the process; the fiber is tensioned via tensioner 807. For this example, the carbon fiber is processed at a linespeed of 2 ft/min.

Fiber material 860 is delivered to sizing removal and fiber spreader station 810 which includes sizing removal heaters 865 and fiber spreader 870. At this station, any "sizing" that is on fiber 860 is removed. Typically, removal is accomplished by burning the sizing off of the fiber. Any of a variety of heating means can be used for this purpose, including, for example, an infrared heater, a muffle furnace, and other non-contact heating processes. Sizing removal can also be accomplished chemically. The fiber spreader separates the individual elements of the fiber. Various techniques and apparatuses can be used to spread fiber, such as pulling the fiber over and under flat, uniform-diameter bars, or over and under variable-diameter bars, or over bars with radially-expanding grooves and a kneading roller, over a vibratory bar, etc. Spreading the fiber enhances the effectiveness of downstream operations, such as plasma application, barrier coating application, and catalyst application, by exposing more fiber surface area.

Multiple sizing removal heaters 865 can be placed throughout the fiber spreader 870 which allows for gradual, simultaneous desizing and spreading of the fibers. Payout and tension station 805 and sizing removal and fiber spreader station 810 are routinely used in the fiber industry; those skilled in the art will be familiar with their design and use.

The temperature and time required for burning off the sizing vary as a function of (1) the sizing material and (2) the commercial source/identity of carbon fiber material 860. A conventional sizing on a carbon fiber material can be removed at about 650° C. At this temperature, it can take as long as 15 minutes to ensure a complete burn off of the sizing. Increasing the temperature above this burn temperature can reduce burn-off time. Thermogravimetric analysis is used to determine minimum burn-off temperature for sizing for a particular commercial product.

Depending on the timing required for sizing removal, sizing removal heaters may not necessarily be included in the CNT-infusion process proper; rather, removal can be performed separately (e.g., in parallel, etc.). In this way, an inventory of sizing-free carbon fiber material can be accumulated and spooled for use in a CNT-infused fiber production line that does not include fiber removal heaters. The sizing-free fiber is then spooled in payout and tension station 805. This production line can be operated at higher speed than one that includes sizing removal.

Unsized fiber 880 is delivered to plasma treatment station 815. For this example, atmospheric plasma treatment is utilized in a 'downstream' manner from a distance of 1 mm from the spread carbon fiber material. The gaseous feedstock is comprised of 100% helium.

Plasma enhanced fiber 885 is delivered to barrier coating station 820. In this illustrative example, a siloxane-based barrier coating solution is employed in a dip coating configuration. The solution is 'Accuglass T-11 Spin-On Glass' (Honeywell International Inc., Morristown, N.J.) diluted in isopropyl alcohol by a dilution rate of 40 to 1 by volume. The resulting barrier coating thickness on the carbon fiber material is approximately 40 nm. The barrier coating can be applied at room temperature in the ambient environment.

Barrier coated carbon fiber 890 is delivered to air dry station 825 for partial curing of the nanoscale barrier coating. The air dry station sends a stream of heated air across the entire carbon fiber spread. Temperatures employed can be in the range of 100° C. to about 500° C.

After air drying, barrier coated carbon fiber 890 is delivered to catalyst application station 830. In this example, an iron oxide-based CNT forming catalyst solution is employed in a dip coating configuration. The solution is 'EFH-1' (Ferrotec Corporation, Bedford, N.H.) diluted in hexane by a dilution rate of 200 to 1 by volume. A monolayer of catalyst coating is achieved on the carbon fiber material. 'EFH-1' prior to dilution has a nanoparticle concentration ranging from 3-15% by volume. The iron oxide nanoparticles are of composition $Fe_2O_3$ and $Fe_3O_4$ and are approximately 8 nm in diameter.

Catalyst-laden carbon fiber material 895 is delivered to solvent flash-off station 835. The solvent flash-off station sends a stream of air across the entire carbon fiber spread. In this example, room temperature air can be employed in order to flash-off all hexane left on the catalyst-laden carbon fiber material.

After solvent flash-off, catalyst-laden fiber 895 is finally advanced to CNT-infusion station 840. In this example, a rectangular reactor with a 12 inch growth zone is used to employ CVD growth at atmospheric pressure. 98.0% of the total gas flow is inert gas (Nitrogen) and the other 2.0% is the carbon feedstock (acetylene). The growth zone is held at 750° C. For the rectangular reactor mentioned above, 750° C. is a relatively high growth temperature, which allows for the highest growth rates possible.

After CNT-infusion, CNT-infused fiber 897 is re-bundled at fiber bundler station 845. This operation recombines the individual strands of the fiber, effectively reversing the spreading operation that was conducted at station 810.

The bundled, CNT-infused fiber 897 is wound about uptake fiber bobbin 850 for storage. CNT-infused fiber 897 is loaded with CNTs approximately 50 μm in length and is then ready for use in composite materials with enhanced thermal and electrical conductivity.

It is noteworthy that some of the operations described above can be conducted under inert atmosphere or vacuum for environmental isolation. For example, if sizing is being burned off of a carbon fiber material, the fiber can be environmentally isolated to contain off-gassing and prevent damage from moisture. For convenience, in system 800, environmental isolation is provided for all operations, with the exception of carbon fiber material payout and tensioning, at the beginning of the production line, and fiber uptake, at the end of the production line.

EXAMPLE II

This example shows how carbon fiber material can be infused with CNTs in a continuous process to target improvements in mechanical properties, especially interfacial characteristics such as shear strength. In this case, loading of shorter CNTs on fibers is targeted. In this example, 34-700 12 k unsized carbon fiber tow with a tex value of 793 (Grafil Inc., Sacramento, Calif.) is implemented as the carbon fiber substrate. The individual filaments in this carbon fiber tow have a diameter of approximately 7 μm.

Figure 9:
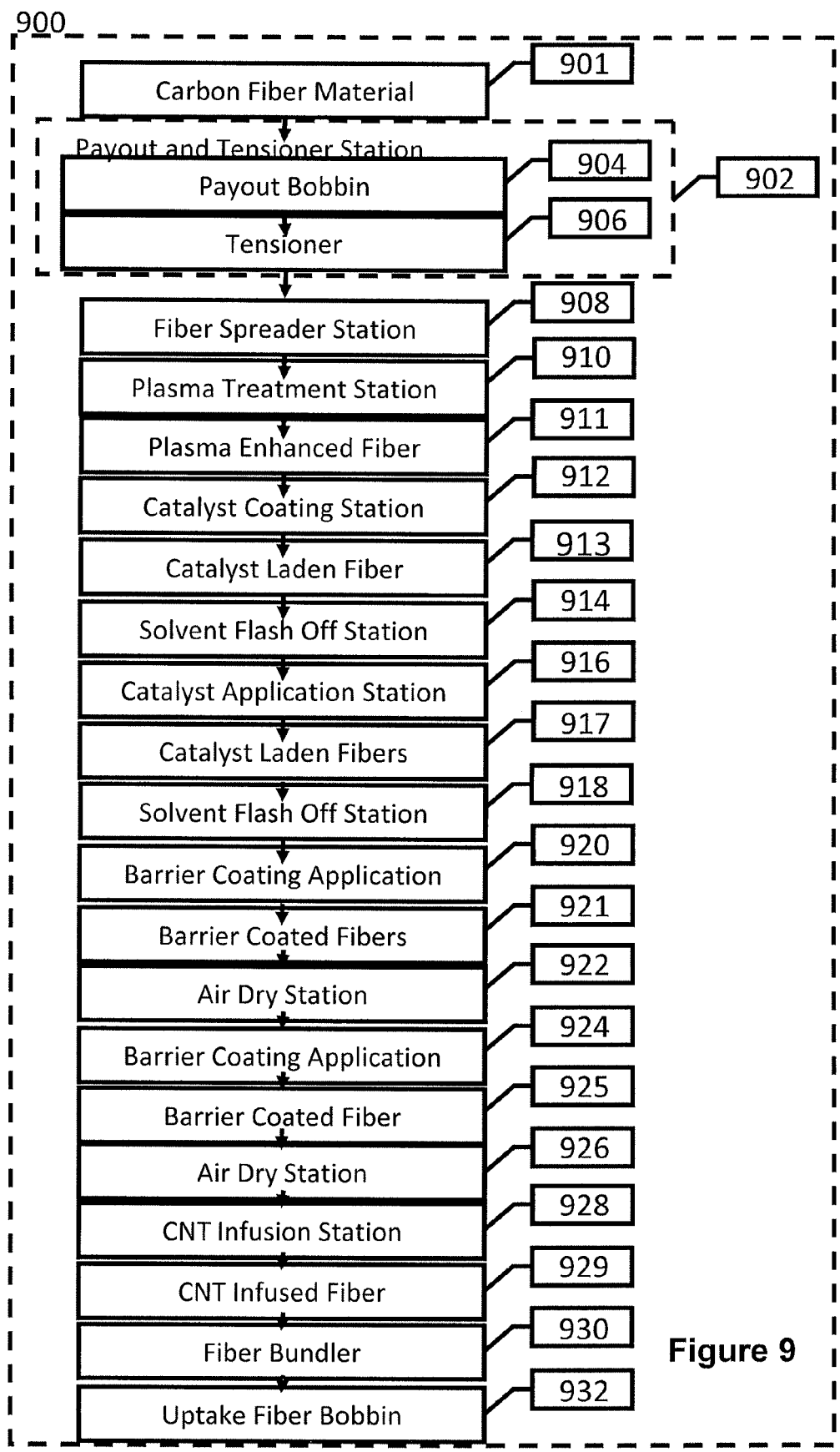
FIG. 9 shows how carbon fiber material can be infused with CNTs in a continuous process using a "reverse" barrier coating process to target improvements in mechanical properties, especially interfacial characteristics such as shear strength.

FIG. 9 depicts system 900 for producing CNT-infused fiber in accordance with the illustrative embodiment of the present invention, and involves many of the same stations and processes described in system 800. System 900 includes a carbon fiber material payout and tensioner station 902, fiber spreader station 908, plasma treatment station 910, catalyst application station 912, solvent flash-off station 914, a second catalyst application station 916, a second solvent flash-off station 918, barrier coating application station 920, air dry station 922, a second barrier coating application station 924, a second air dry station 926, CNT-infusion station 928, fiber bundler station 930, and carbon fiber material uptake bobbin 932, interrelated as shown.

Payout and tension station 902 includes payout bobbin 904 and tensioner 906. The payout bobbin delivers carbon fiber material 901 to the process; the fiber is tensioned via tensioner 906. For this example, the carbon fiber is processed at a linespeed of 2 ft/min.

Fiber material 901 is delivered to fiber spreader station 908. As this fiber is manufactured without sizing, a sizing removal process is not incorporated as part of fiber spreader station 908. The fiber spreader separates the individual elements of the fiber in a similar manner as described in fiber spreader 870.

Fiber material 901 is delivered to plasma treatment station 910. For this example, atmospheric plasma treatment is utilized in a 'downstream' manner from a distance of 12 mm from the spread carbon fiber material. The gaseous feedstock is comprised of oxygen in the amount of 1.1% of the total inert gas flow (helium). Controlling the oxygen content on the surface of carbon fiber material is an effective way of enhancing the adherence of subsequent coatings, and is therefore desirable for enhancing mechanical properties of a carbon fiber composite.

Plasma enhanced fiber 911 is delivered to catalyst application station 912. In this example, an iron oxide based CNT forming catalyst solution is employed in a dip coating configuration. The solution is 'EFH-1' (Ferrotec Corporation, Bedford, N.H.) diluted in hexane by a dilution rate of 200 to 1 by volume. A monolayer of catalyst coating is achieved on the carbon fiber material. 'EFH-1' prior to dilution has a nanoparticle concentration ranging from 3-15% by volume. The iron oxide nanoparticles are of composition $Fe_2O_3$ and $Fe_3O_4$ and are approximately 8 nm in diameter.

Catalyst-laden carbon fiber material 913 is delivered to solvent flash-off station 914. The solvent flash-off station sends a stream of air across the entire carbon fiber spread. In this example, room temperature air can be employed in order to flash-off all hexane left on the catalyst-laden carbon fiber material.

After solvent flash-off, catalyst laden fiber 913 is delivered to catalyst application station 916, which is identical to catalyst application station 912. The solution is 'EFH-1' diluted in hexane by a dilution rate of 800 to 1 by volume. For this example, a configuration which includes multiple catalyst application stations is utilized to optimize the coverage of the catalyst on the plasma enhanced fiber 911.

Catalyst-laden carbon fiber material 917 is delivered to solvent flash-off station 918, which is identical to solvent flash-off station 914.

After solvent flash-off, catalyst-laden carbon fiber material 917 is delivered to barrier coating application station 920. In this example, a siloxane-based barrier coating solution is employed in a dip coating configuration. The solution is 'Accuglass T-11 Spin-On Glass' (Honeywell International Inc., Morristown, N.J.) diluted in isopropyl alcohol by a dilution rate of 40 to 1 by volume. The resulting barrier coating thickness on the carbon fiber material is approximately 40 nm. The barrier coating can be applied at room temperature in the ambient environment.

Barrier coated carbon fiber 921 is delivered to air dry station 922 for partial curing of the barrier coating. The air dry station sends a stream of heated air across the entire carbon fiber spread. Temperatures employed can be in the range of 100° C. to about 500° C.

After air drying, barrier coated carbon fiber 921 is delivered to barrier coating application station 924, which is identical to barrier coating application station 820. The solution is 'Accuglass T-11 Spin-On Glass' diluted in isopropyl alcohol by a dilution rate of 120 to 1 by volume. For this example, a configuration which includes multiple barrier coating application stations is utilized to optimize the coverage of the barrier coating on the catalyst-laden fiber 917.

Barrier coated carbon fiber 925 is delivered to air dry station 926 for partial curing of the barrier coating, and is identical to air dry station 922.

After air drying, barrier coated carbon fiber 925 is finally advanced to CNT-infusion station 928. In this example, a rectangular reactor with a 12 inch growth zone is used to employ CVD growth at atmospheric pressure. 97.75% of the total gas flow is inert gas (Nitrogen) and the other 2.25% is the carbon feedstock (acetylene). The growth zone is held at 650° C. For the rectangular reactor mentioned above, 650° C. is a relatively low growth temperature, which allows for the control of shorter CNT growth.

After CNT-infusion, CNT-infused fiber 929 is re-bundled at fiber bundler 930. This operation recombines the individual strands of the fiber, effectively reversing the spreading operation that was conducted at station 908.

The bundled, CNT-infused fiber 931 is wound about uptake fiber bobbin 932 for storage. CNT-infused fiber 929 is loaded with CNTs approximately 5 µm in length and is then ready for use in composite materials with enhanced mechanical properties.

In this example, the carbon fiber material passes through catalyst application stations 912 and 916 prior to barrier coating application stations 920 and 924. This ordering of coatings is in the 'reverse' order as illustrated in Example I, which can improve anchoring of the CNTs to the carbon fiber substrate. During the CNT growth process, the barrier coating layer is lifted off of the substrate by the CNTs, which allows for more direct contact with the carbon fiber material (via catalyst NP interface). Because increases in mechanical properties, and not thermal/electrical properties, are being targeted, a 'reverse' order coating configuration is desirable.

It is noteworthy that some of the operations described above can be conducted under inert atmosphere or vacuum for environmental isolation. For convenience, in system 900, environmental isolation is provided for all operations, with the exception of carbon fiber material payout and tensioning, at the beginning of the production line, and fiber uptake, at the end of the production line.

EXAMPLE III

This example shows how carbon fiber material can be infused with CNTs in a continuous process to target improvements in mechanical properties, especially interfacial characteristics such as interlaminar shear.

In this example, loading of shorter CNTs on fibers is targeted. In this example, 34-700 12 k unsized carbon fiber tow with a tex value of 793 (Grafil Inc., Sacramento, Calif.) is implemented as the carbon fiber substrate. The individual filaments in this carbon fiber tow have a diameter of approximately 7 µm.

Figure 10:
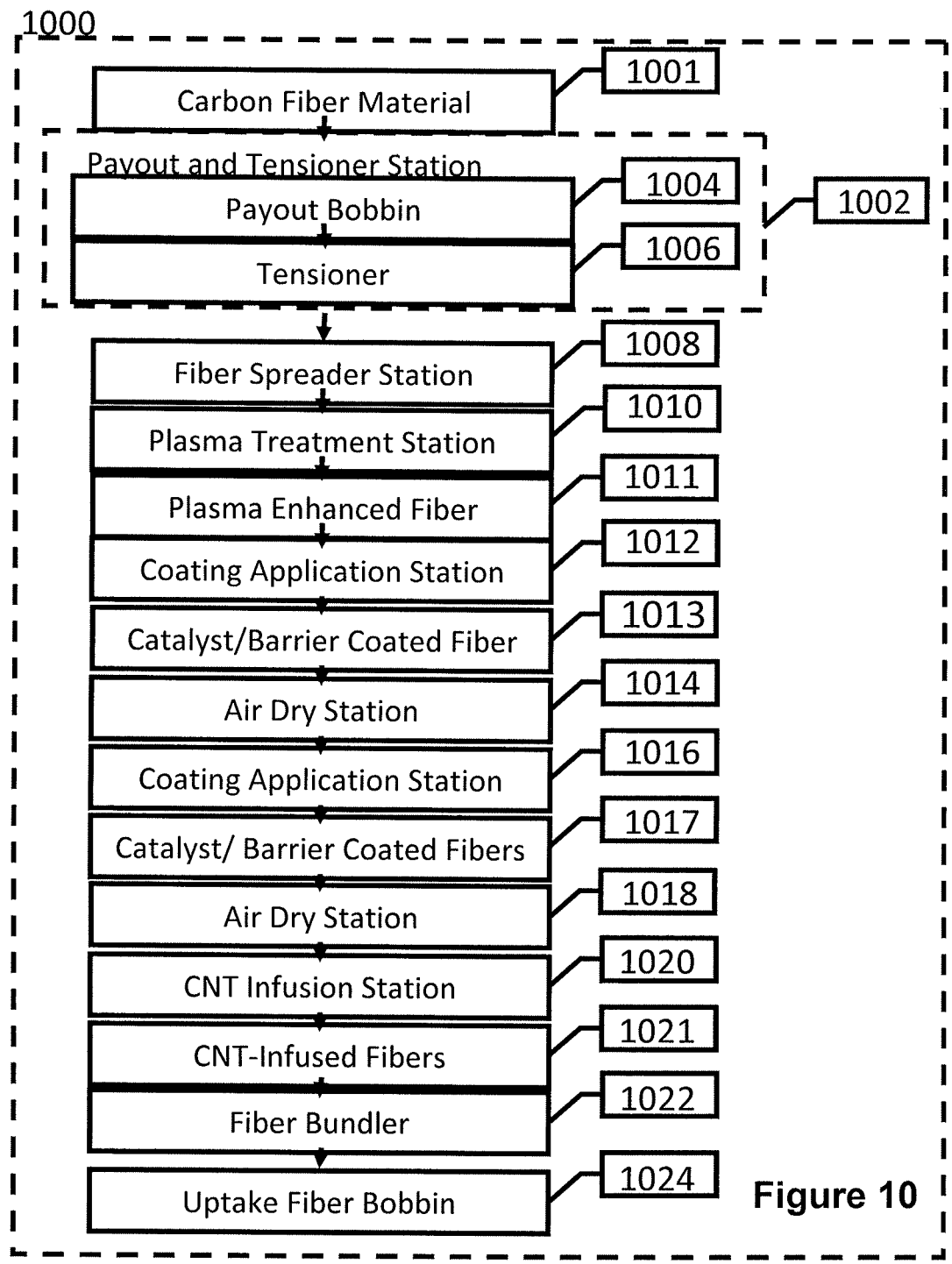
FIG. 10 shows how carbon fiber material can be infused with CNTs in another continuous process using a "hybrid" barrier coating to target improvements in mechanical properties, especially interfacial characteristics such as shear strength and interlaminar fracture toughness.
Figure 11:
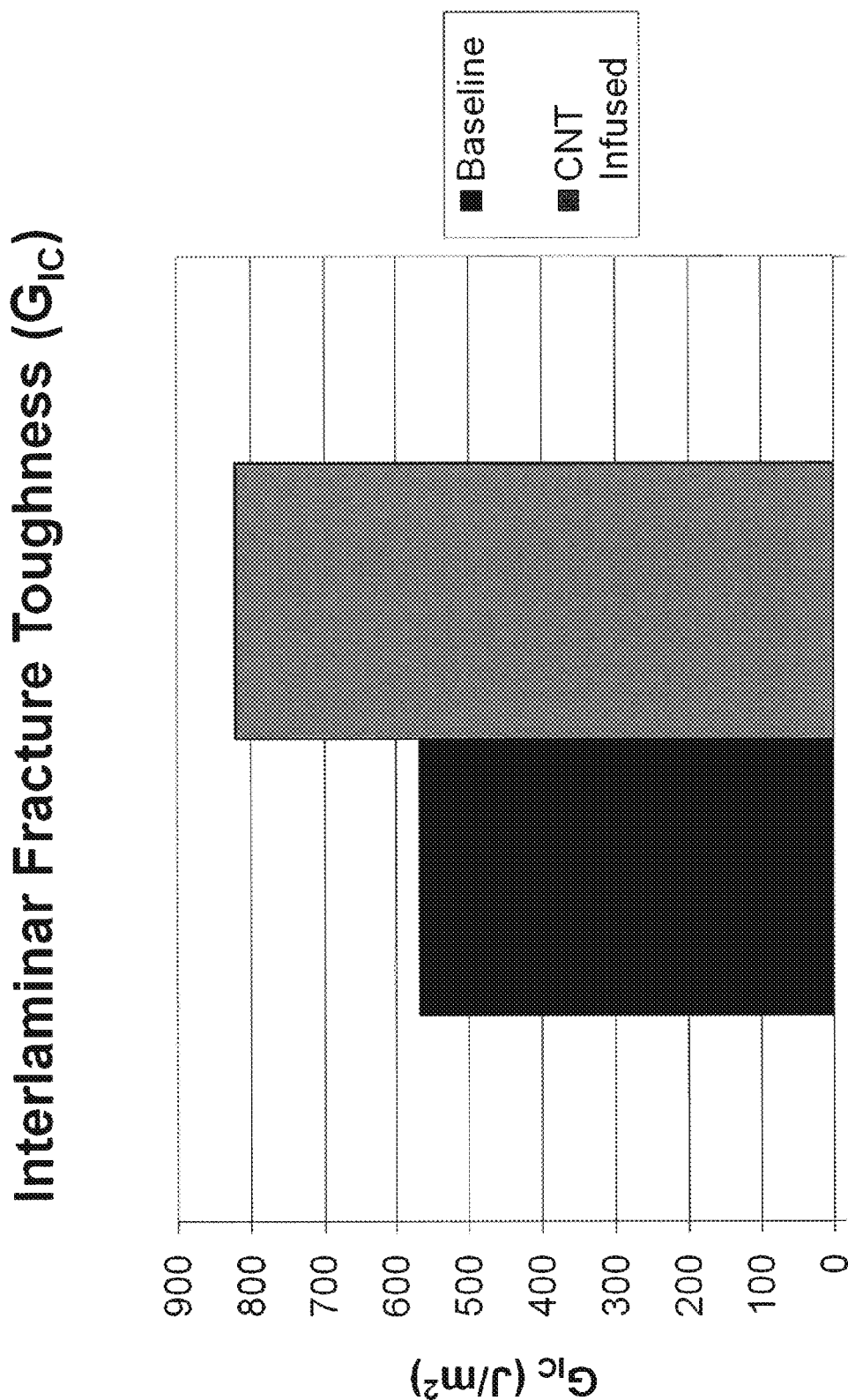
FIG. 11 shows the effect of infused CNTs on IM7 carbon fiber on interlaminar fracture toughness. The baseline material is an unsized IM7 carbon fiber, while the CNT-Infused material is an unsized carbon fiber with 15 micron long CNTs infused on the fiber surface.

FIG. 10 depicts system 1000 for producing CNT-infused fiber in accordance with the illustrative embodiment of the present invention, and involves many of the same stations and processes described in system 800. System 1000 includes a carbon fiber material payout and tensioner station 1002, fiber spreader station 1008, plasma treatment station 1010, coating application station 1012, air dry station 1014, a second coating application station 1016, a second air dry station 1018, CNT-infusion station 1020, fiber bundler station 1022, and carbon fiber material uptake bobbin 1024, interrelated as shown.

Payout and tension station 1002 includes payout bobbin 1004 and tensioner 1006. The payout bobbin delivers carbon fiber material 1001 to the process; the fiber is tensioned via tensioner 1006. For this example, the carbon fiber is processed at a linespeed of 5 ft/min.

Fiber material 1001 is delivered to fiber spreader station 1008. As this fiber is manufactured without sizing, a sizing removal process is not incorporated as part of fiber spreader station 1008. The fiber spreader separates the individual elements of the fiber in a similar manner as described in fiber spreader 870.

Fiber material 1001 is delivered to plasma treatment station 1010. For this example, atmospheric plasma treatment is utilized in a 'downstream' manner from a distance of 12 mm from the spread carbon fiber material. The gaseous feedstock is comprised of oxygen in the amount of 1.1% of the total inert gas flow (helium). Controlling the oxygen content on the surface of carbon fiber material is an effective way of enhancing the adherence of subsequent coatings, and is therefore desirable for enhancing mechanical properties of a carbon fiber composite.

Plasma enhanced fiber 1011 is delivered to coating application station 1012. In this example, an iron oxide based catalyst and a barrier coating material is combined into a single 'hybrid' solution and is employed in a dip coating configuration. The 'hybrid' solution is 1-part-by-volume 'EFH-1', 5-parts 'Accuglass T-11 Spin-On Glass', 24-parts hexane, 24-parts isopropyl alcohol, and 146-parts tetrahydrofuran. The benefit of employing such a 'hybrid' coating is that it marginalizes the effect of fiber degradation at high temperatures. Without being bound by theory, degradation to carbon fiber materials is intensified by the sintering of catalyst NPs at high temperatures (the same temperatures vital to the growth of CNTs). By encapsulating each catalyst NP with its own barrier coating, it is possible to control this effect. Because increases in mechanical properties, and not thermal/electrical properties, is being targeted, it is desirable to maintain the integrity of the carbon fiber base-material, therefore a 'hybrid' coating can be employed.

Catalyst-laden and barrier coated carbon fiber material 1013 is delivered to air dry station 1014 for partial curing of the barrier coating. The air dry station sends a stream of heated air across the entire carbon fiber spread. Temperatures employed can be in the range of 100° C. to about 500° C.

After air drying, the catalyst and barrier coating-laden carbon fiber 1013 is delivered to coating application station 1016, which is identical to coating application station 1012. The same 'hybrid' solution is used (1-part-by-volume 'EFH-1', 5-parts 'Accuglass T-11 Spin-On Glass', 24-parts hexane, 24-parts isopropyl alcohol, and 146-parts tetrahydrofuran). For this example, a configuration which includes multiple coating application stations is utilized to optimized the coverage of the 'hybrid' coating on the plasma enhanced fiber 1011.

Catalyst and barrier coating-laden carbon fiber 1017 is delivered to air dry station 1018 for partial curing of the barrier coating, and is identical to air dry station 1014.

After air drying, catalyst and barrier coating-laden carbon fiber 1017 is finally advanced to CNT-infusion station 1020. In this example, a rectangular reactor with a 12 inch growth zone is used to employ CVD growth at atmospheric pressure. 98.7% of the total gas flow is inert gas (Nitrogen) and the other 1.3% is the carbon feedstock (acetylene). The growth zone is held at 675° C. For the rectangular reactor mentioned above, 675° C. is a relatively low growth temperature, which allows for the control of shorter CNT growth.

After CNT-infusion, CNT-infused fiber 1021 is re-bundled at fiber bundler 1022. This operation recombines the individual strands of the fiber, effectively reversing the spreading operation that was conducted at station 1008.

The bundled, CNT-infused fiber 1021 is wound about uptake fiber bobbin 1024 for storage. CNT-infused fiber 1021 is loaded with CNTs approximately 2 μm in length and is then ready for use in composite materials with enhanced mechanical properties.

It is noteworthy that some of the operations described above can be conducted under inert atmosphere or vacuum for environmental isolation. For convenience, in system 1000, environmental isolation is provided for all operations, with the exception of carbon fiber material payout and tensioning, at the beginning of the production line, and fiber uptake, at the end of the production line.

Although the invention has been described with reference to the disclosed embodiments, those skilled in the art will readily appreciate that these only illustrative of the invention. It should be understood that various modifications can be made without departing from the spirit of the invention.

What is claimed is:

1. A tailored composite comprising:
   a matrix material; and
   a first plurality of carbon nanotube (CNT)-infused fibers dispersed in a first location of the matrix material and a second plurality of carbon nanotube-infused fibers dispersed in a second location of the matrix material;
   wherein the CNT-infused fibers comprise carbon nanotubes that are grown in situ on an exterior surface of a fiber material and extend therefrom;
   wherein the amount of carbon nanotubes in the tailored composite is in a range between about 0.1 percent by weight to about 60 percent by weight of the tailored composite; and
   wherein the first plurality of carbon nanotube-infused fibers and the second plurality of carbon nanotube-infused fibers differ in any combination of CNT length, CNT density, or CNT alignment with respect to the fiber material to provide a differential enhancement in at least one property selected from the group consisting of mechanical, thermal, and electrical properties in each location of the tailored composite.

2. The tailored composite of claim 1, wherein the amount of carbon nanotubes in the tailored composite is in a range between about 10 percent to about 60 percent by weight of the tailored composite.

3. The tailored composite of claim 1, wherein the amount of carbon nanotubes in the tailored composite is in a range between about 15 percent to about 60 percent by weight of the tailored composite.

4. The tailored composite of claim 1, wherein the amount of carbon nanotubes in the tailored composite is in a range between about 20 percent to about 60 percent by weight of the tailored composite.

5. The tailored composite of claim 1, wherein the amount of carbon nanotubes in the tailored composite is in a range between about 25 percent to about 60 percent by weight of the tailored composite.

6. The tailored composite of claim 1, wherein the amount of carbon nanotubes in the tailored composite is in a range between about 10 percent to about 50 percent by weight of the tailored composite.

7. The tailored composite of claim 1, wherein the amount of carbon nanotubes in the tailored composite is in a range between about 20 percent to about 40 percent by weight of the tailored composite.

8. The tailored composite of claim 1, wherein the amount of carbon nanotubes in the tailored composite is in a range between about 5 percent to about 10 percent by weight of the tailored composite.

9. The tailored composite of claim 1, wherein the amount of carbon nanotubes in the tailored composite is in a range between about 10 percent to about 20 percent by weight of the tailored composite.

10. The tailored composite of claim 1, wherein the amount of carbon nanotubes in the tailored composite is in a range between about 20 percent to about 30 percent by weight of the tailored composite.

11. The tailored composite of claim 1, wherein the amount of carbon nanotubes in the tailored composite is in a range between about 30 percent to about 40 percent by weight of the tailored composite.

12. The tailored composite of claim 1, wherein the amount of carbon nanotubes in the tailored composite is in a range between about 40 percent to about 50 percent by weight of the tailored composite.

13. The tailored composite of claim 1, wherein the amount of carbon nanotubes in the tailored composite is in a range between about 50 percent to about 60 percent by weight of the tailored composite.

14. The tailored composite of claim 1, wherein the amount of carbon nanotubes in the tailored composite is in a range between about 40 percent to about 60 percent by weight of the tailored composite.

15. The tailored composite of claim 1, wherein the amount of carbon nanotubes in the tailored composite is about 10 percent by weight of the tailored composite.

16. The tailored composite of claim 1, wherein the amount of carbon nanotubes in the tailored composite is about 15 percent by weight of the tailored composite.

17. The tailored composite of claim 1, wherein the amount of carbon nanotubes in the tailored composite is about 20 percent by weight of the tailored composite.

18. The tailored composite of claim 1, wherein the amount of carbon nanotubes in the tailored composite is about 25 percent by weight of the tailored composite.

19. The tailored composite of claim 1, wherein the amount of carbon nanotubes in the tailored composite is about 30 percent by weight of the tailored composite.

20. The tailored composite of claim 1, wherein the amount of carbon nanotubes in the tailored composite is about 35 percent by weight of the tailored composite.

21. The tailored composite of claim 1, wherein the CNT-infused fibers comprise a fiber tow.

22. The tailored composite of claim 1, wherein the CNT-infused fibers comprise a plurality of rovings.

23. The tailored composite of claim 1, wherein the CNT-infused fibers comprise a fabric.

24. The tailored composite of claim 1, wherein CNT-infused fibers are distributed homogenously throughout the matrix material.

25. The tailored composite of claim 1, wherein carbon nanotubes are present in a concentration gradient throughout a portion of the matrix material.

26. The tailored composite of claim 1, wherein CNT-infused fibers are distributed substantially only near the surface of the tailored composite.

27. The tailored composite of claim 1, wherein the carbon nanotubes grown in situ on the fiber material are oriented in a pattern.

28. The tailored composite of claim 1, wherein the carbon nanotubes grown in situ on the fiber material are disposed radially about the fiber material axes.

29. The tailored composite of claim 1, wherein the carbon nanotubes grown in situ on the fiber material are disposed parallel to the fiber material axes.

30. The tailored composite of claim 1, wherein a length of the carbon nanotubes differs in the first location and the second location within the tailored composite.

31. The tailored composite of claim 1, wherein a density of the carbon nanotubes differs in the first location and the second location within the tailored composite.

32. The tailored composite of claim 1, wherein an alignment of the carbon nanotubes differs in the first location and the second location within the tailored composite.

* * * * *